US008527327B1

(12) United States Patent
Lawrence

(10) Patent No.: US 8,527,327 B1
(45) Date of Patent: Sep. 3, 2013

(54) METHOD AND APPARATUS TO MANAGE PROJECT CONTROL

(76) Inventor: Mark Lawrence, Monrovia, CA (US)

( * ) Notice: Subject to any disclaimer, the term of this patent is extended or adjusted under 35 U.S.C. 154(b) by 113 days.

(21) Appl. No.: 13/046,775

(22) Filed: Mar. 14, 2011

Related U.S. Application Data

(60) Provisional application No. 61/315,977, filed on Mar. 21, 2010.

(51) Int. Cl.
*G06Q 10/00* (2012.01)

(52) U.S. Cl.
USPC ........ 705/7.38; 705/7.39; 705/7.41; 705/7.27

(58) Field of Classification Search
None
See application file for complete search history.

(56) References Cited

U.S. PATENT DOCUMENTS

| | | | |
|---|---|---|---|
| 5,581,466 | A | 12/1996 | Van Wyk et al. |
| 5,956,251 | A | 9/1999 | Atkinson et al. |
| 2002/0138318 | A1 | 9/2002 | Ellis et al. |
| 2002/0143602 | A1* | 10/2002 | Chappel et al. ............... 705/10 |
| 2003/0236692 | A1 | 12/2003 | Hertel-Szabadi |
| 2004/0059588 | A1* | 3/2004 | Burritt et al. ................. 705/1 |
| 2005/0065754 | A1 | 3/2005 | Schaf et al. |
| 2006/0259336 | A1 | 11/2006 | Anas et al. |
| 2007/0067196 | A1* | 3/2007 | Usui ................................. 705/8 |
| 2007/0288199 | A1 | 12/2007 | Washizawa |
| 2008/0082389 | A1* | 4/2008 | Gura ................................. 705/9 |
| 2008/0140485 | A1* | 6/2008 | Williams ......................... 705/7 |
| 2008/0243912 | A1 | 10/2008 | Azvine et al. |
| 2009/0076867 | A1 | 3/2009 | Eryaman |
| 2009/0216602 | A1* | 8/2009 | Henderson ..................... 705/9 |
| 2009/0222275 | A1 | 9/2009 | Cantor et al. |
| 2009/0276260 | A1* | 11/2009 | Douglas et al. ................. 705/7 |
| 2010/0070332 | A1* | 3/2010 | Mahesh ............................ 705/9 |
| 2011/0145034 | A1* | 6/2011 | Moore .......................... 705/7.17 |

FOREIGN PATENT DOCUMENTS

| | | |
|---|---|---|
| WO | WO00/79350 | 12/2000 |
| WO | WO02/05138 | 1/2002 |

OTHER PUBLICATIONS

Yu, Ilhan, et al. "Comparable performance measurement system for construction companies." Journal of Management in Engineering 23.3 (2007): 131-139.*
Labuschagne, Carin, and Alan C. Brent. "Sustainable project life cycle management: the need to integrate life cycles in the manufacturing sector." International Journal of Project Management 23.2 (2005): 159-168.*
Anbari, Frank T. "Earned value project management method and extensions." Project management journal 34.4 (2003): 12-23.*
Lohman, Clemens, Leonard Fortuin, and Marc Wouters. "Designing a performance measurement system: a case study." European Journal of Operational Research 156.2 (2004): 267-286.*

(Continued)

*Primary Examiner* — Jonathan G Sterrett
*Assistant Examiner* — Tzu-Hsiang Lan

(57) ABSTRACT

The present invention is a method and apparatus to determine which aspects of a project are under control and whether the trend is toward increasing or decreasing control. The degree of control is measured within and across projects for different drivers of project performance. This gives the project organization a holistic view of whether specific project enablers are driving projects out of control or contributing to bringing projects under control. This also enables organizations to use project control trends to implement corrective actions proactively. Effective project control also increases the probability that each project activity and the overall project will be completed as planned. In addition, effective project control leads to more predictable project timelines and a greater willingness for suppliers to provide fixed priced project services.

20 Claims, 20 Drawing Sheets

(56) References Cited

OTHER PUBLICATIONS

Lebas, Michel J. "Performance measurement and performance management." International journal of production economics 41.1 (1995): 23-35.*

Desborough, Lane, and Randy Miller. "Increasing customer value of industrial control performance monitoring-Honeywell's experience." AIChE symposium series. New York; American Institute of Chemical Engineers; 1998, 2002.*

Why Warehouse It Projects Fail, PC Week, Dec. 5, 1999, Tom Wright.
Chaos Chronicles Report 2003, Standish Group.
More Failures Than Success, TechRepublic.com, AMR Research, Jan. 2004, How You Define Crm Success Depends on Who You Are.
When Bad Things Happen to Good Projects, CIO Magazine, Dec. 1, 2004.
AT&T Wireless Self Destructs, Cio Magazine, Dec. 1, 2004.
A Guide to the Project Management Body of Knowledge (PMBOK), Project Management Institute, 2000 Edition.

* cited by examiner

Enable the project team to enter new project activities and meta data into the present invention and update existing project activities and meta data.

102

Review each new and updated project activity and its associated meta data before updating and approving that project activity.

103

Review the existing meta data and add additional meta data to each new and updated project activity.

104

Authorize the new or updated project activity for use in reports.

105

Update and enable the periodic reports.

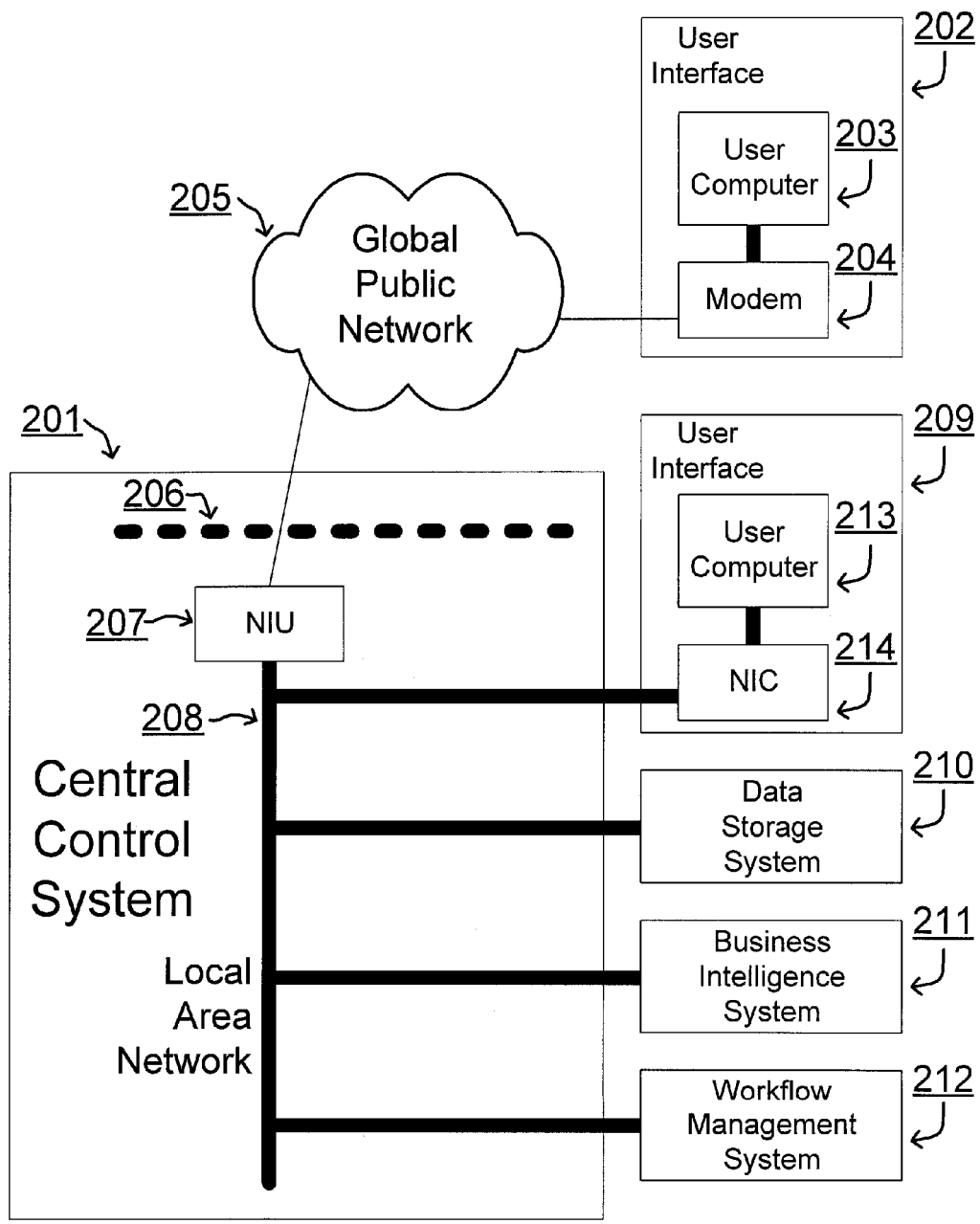

Fig. 13

| Project | Project Stage | Stage Index |
|---|---|---|
| System Upgrade | Initiation | 1 |

| Deliverable | Deliverable Type | Received | Last Change |
|---|---|---|---|
| Business Plan | Document | 06/15/2009 | 06/15/2009 |

Summary: Distribute business case for review ←—1301

| Planned Start | Planned End | Planned Duration |
|---|---|---|
| 06/20/2009 ←1302 | 06/25/2009 ←1303 | 5 Days ←1304 |
| Actual Start | Actual End | Actual Duration |
| 06/20/2009 ←1305 | 06/28/2009 ←1306 | 8 Days ←1307 |

| Estimate Type | Estimate Accuracy | Duration UOM |
|---|---|---|
| Probable | Definitive | Days |

| Status Owner | Status | Status Date |
|---|---|---|
| Joe Smith | Closed ←1308 | 06/18/2009 |

| Contact | Organization | Location | Process | Category |
|---|---|---|---|---|
| | | | | |

| Planned | Scheduled | Authorized | VApproved | VAuthorized |
|---|---|---|---|---|
| ←1309 | ←1310 | ←1311 | | |

| Importance | Cause Enabler | Effect Enabler | RecordID |
|---|---|---|---|
| ←1312 | Business Case ←1313 | Revenue ←1314 | 20091501091527 |

Fig. 14

| Project | Project Stage | Stage Index | Delievreable |
|---|---|---|---|
| System Upgrade | Initiation | 1 | Business Case |

| Originator | Last Updated By | Received | Last Change |
|---|---|---|---|
| Joe Smith | Mary Hart | 06/15/2009 | 07/22/2009 |

| Record ID | Risk Impact | Risk Status | Response Type |
|---|---|---|---|
| 20090615162745 | Scope | Under Control | Accept |

| | | | |
|---|---|---|---|
| Risk Condition | If the vision in the business case is not correct ←1401 | Risk Triggers | Poor response from users during acceptance testing |
| Risk Impact | THEN the benefits will not justify the costs ←1402 | Residual Risks | Will accept up to a 10% variance in project benefits. |
| Mitigation Plan | Risk mitigated by completing VOC workshops ←1403 | Secondary Risks | The consultant vendor who developed the business case |
| Contingency Plan | Contingency is adjustments for future releases ←1404 | Fallback Options | Re-develop the business case |
| Risk of Not Taking Risk | Alternative risk is project benefits will not be realized | Risk Opportunity | Negative |

Risk Probability |30%| 1405    Project Impact |70%|    Risk Score |21%|

| Impacted Roles | Impacted Groups | Impacted Locations | Impacted Processes | Impacted Systems |
|---|---|---|---|---|
| Business Analyst | Sales | Head Office | Customer Service | CRM |

| User Field 1 | User Field 2 | User Field 3 | User Field 4 | User Field 5 |
|---|---|---|---|---|
| | | | | |

RecordID
20091501091527

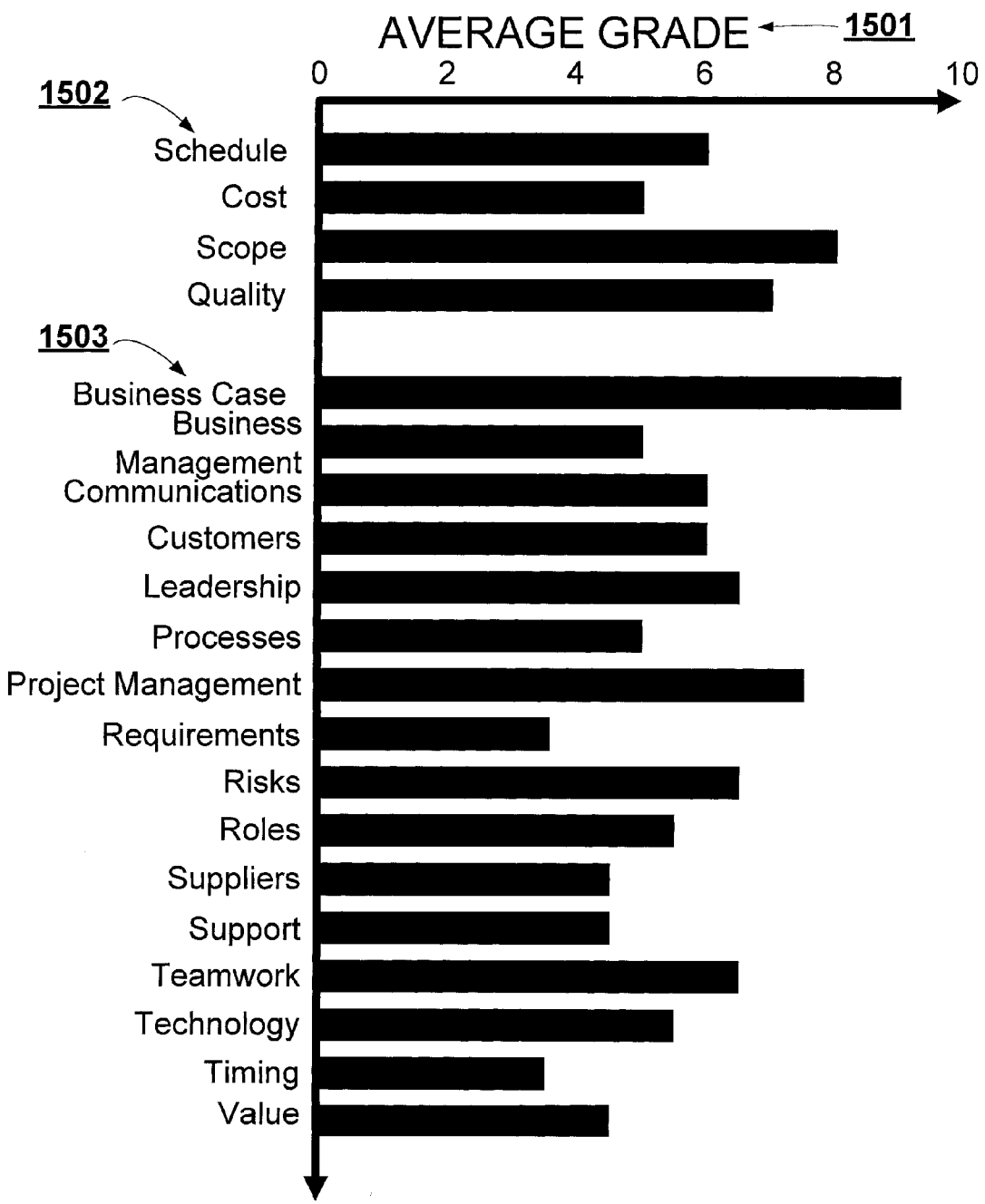

Fig. 17

| Project | Project Stage | Stage Index |
|---|---|---|
| System Upgrade | Initiation | 1 |

| User | Received | Last Updated By | Last Change |
|---|---|---|---|
| Joe Smith | 06/15/2009 | 1 | 06/15/2009 |

| RecordID | Category | Status |
|---|---|---|
| 20091501091527 | Schedule | Draft |

IF [Schedule] < 5 AND [Leadership] < 4    ← 1701

THEN Provide additional training for the project leadership team on leadership skills and its impact on project schedule.    ← 1702

Available Fields [Business Case], [Cost], [Customer Satisfaction], [General Management], [Leadership], [Processes], [Project Management], [Quality], [Requirements], [Risks], [Role], [Schedule], [Scope], [Suppliers], [Support/Resources], [Teamwork], [Technology], [Timing], [Value]

Comments

Fig. 18

Corrective Action Plan

Project ID  [System Upgrade]  ←—1801

Project Stage  [Initiation]  ←—1802

Stage Index [1] ←—1803        1804        1805

| Date | Recommended Corrective Actions | Corrective Resource |
|---|---|---|
| 06/15/2009 | Conduct additional leadership training for all project leads and emphasize relationship between leadership and schedule performance | Joe Jones, Trainer<br>Mary Lu, project manager |
| 06/15/2009 | Emphasize more effective communication during periodic project meetings particularly for cost goals. | Paul Smith, Trainer<br>Billy Bean, project manager |

Project Stage  [Planning]

Stage Index [1]

| Date | Recommended Corrective Actions | Corrective Resource |
|---|---|---|
| 06/15/2009 | Review schedule commitments with suppliers and ensure they have sufficient resources to meet objectives. | Betty Brown, vendor team |
| 06/15/2009 | Ensure quality assurance has at least one test case to validate each feature agreed during scope planning. | Hitesh Lee, QA |

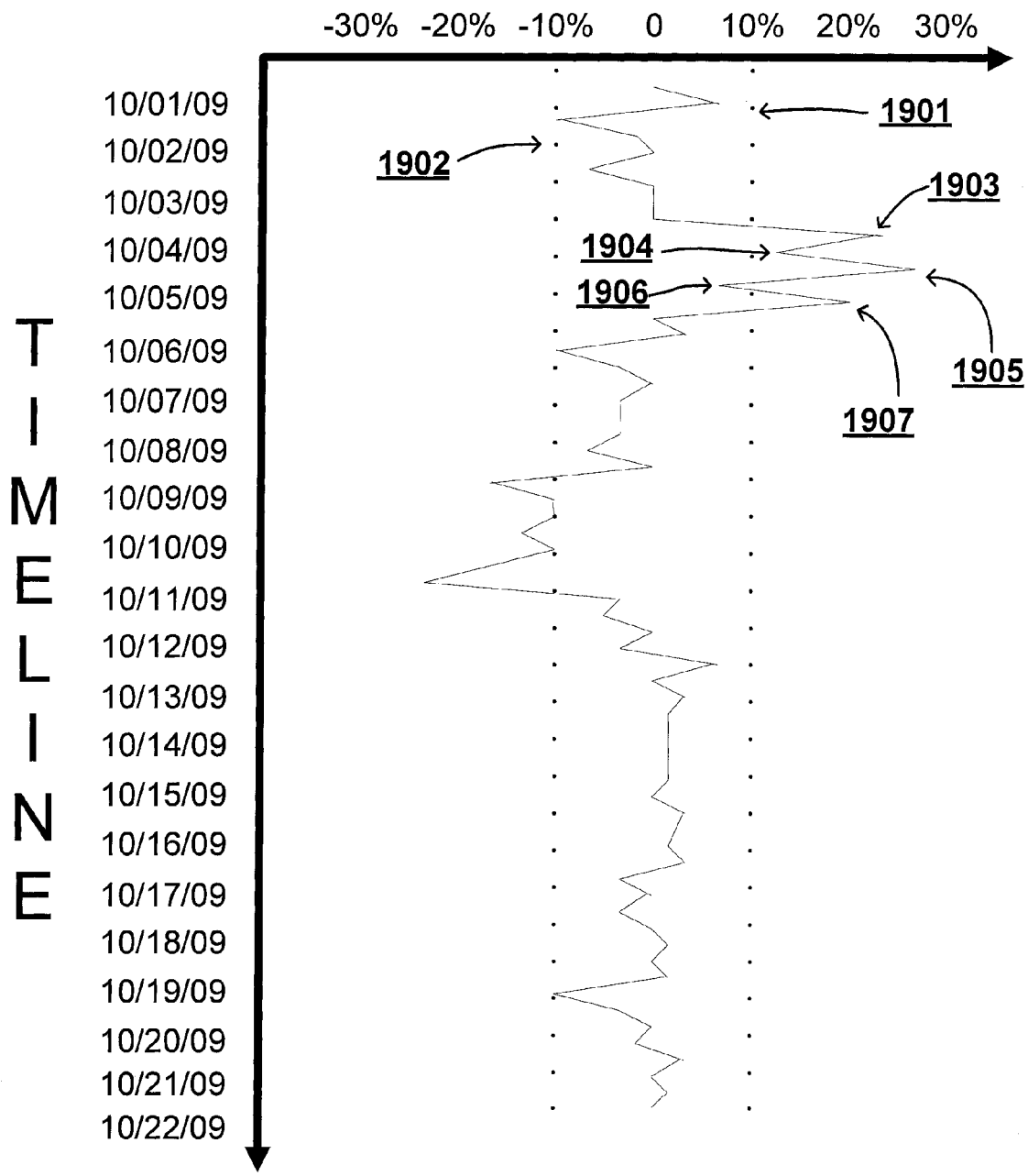
Fig. 19 Project Activity Duration Percentage Variance

METHOD AND APPARATUS TO MANAGE PROJECT CONTROL

CROSS REFERENCE TO RELATED APPLICATION

This application claims the benefit of provisional patent application Ser. No. 61/315,977 filed 2010 Mar. 21 by the present inventor.

This application is related to the following commonly-owned United States Patent Applications; Provisional Patent Application 61/327,720, Provisional Patent Application 61/315,977, Provisional Patent Application 61/361,431, Provisional Patent Application 60/140,479 (Jun. 22, 1999), Provisional Patent Application 60/216,767 (Jun. 7, 2000), application Ser. No. 09/599,673 (Jun. 22, 2000), and application Ser. No. 10/716,847 (Nov. 18, 2003).

This application is also related to the following commonly-owned International Patent Applications; WO 00/79350 (Dec. 28, 2000), WO 02/05138 (Jan. 17, 2002), and PCT/US00/17247 (Jun. 22, 2000).

The workflow management system taught herein is a part of the present invention and is a new use of the Process Automation Software taught in application Ser. No. 10/716,747 (Nov. 18, 2003).

FEDERALLY SPONSORED RESEARCH

None.

SEQUENCE LISTING

None.

BACKGROUND OF THE PRESENT INVENTION

1) Field of the Invention

This invention relates generally to the field of project control management.

2) Background

In this disclosure, a project is defined as a sequence of activities that must be implemented to complete the deliverables that comprise the project's main work product. Organizations usually undertake projects to achieve a benefit whose value exceeds both the cost of the project and the cost of the disruption caused by the project. The benefits from some projects can be substantial, such as the development of a new product that transforms an organization. Organizations usually allocate a budget and timeframe to complete the planned deliverables in each project.

In this disclosure, a project stage is defined as a sub-set of activities within a project that has a defined start activity and a defined end activity. The size of a project stage can range from one activity in a project to all activities in a project.

A shared service is an organizational function that provides a common service to multiple projects. For example, a design and engineering function may build generic computer servers and deliver them to application teams who can then change the generic configuration data to meet their unique needs before installing their applications.

In this disclosure, project control is defined as the ability to predict the actual cost and actual timeframe to complete the key project activities that are required to deliver the expected scope and quality. If a project is in control then the timeframe and cost to complete key project activities is substantially predictable.

In this disclosure, the term near real time refers to the predetermined time difference between an event and the response to that event. For each event, this time difference is predetermined by the organization that is undertaking the project (e.g., the project organization). For example, the project organization may specify that selected information about predefined project activities must be entered into the project activity database within 24 hours of the change occurring but management reporting may occur on a weekly basis. In this example, near real time is within 24 hours for entering project activities and 1 week for management reports. The same project organization may mandate that other information about predefined project activities must be reported more frequently or less frequently depending on the needs and expectations of that particular project organization.

In this disclosure, a project task is defined as a planned activity that is specified in a project plan. An action item is defined as an unplanned project activity that is not specified in the project plan.

In this disclosure, a project enabler is a resource that can impact a project activity. Examples of project enablers include project team members, project roles, organizational units, shared services, business procedures, business systems, project stages, project stakeholders and project suppliers. This list is not intended to be exhaustive or limiting. Other examples will be apparent to one skilled in the art.

In this disclosure, meta data is information about a project activity. Meta data can take many forms including dates, numbers, currency and text. This meta data is stored in the project activity database with the summary of each project activity. Examples of meta data include project name, project stage, user name, origination date and date updated.

The failure rate of enterprise projects is reported to be as high as 74% in PC Week (Dec. 5, 1999) and the success rate as low as 34% in studies such as the Chaos Chronicles Report 2003 published by the Standish Group. Moreover, only 16% of projects are reported to have a measurable influence on business performance (More failures than successes, TechRepublic.com, AMR Research). Failure is usually defined as not delivering all of the planned features and/or exceeding the budget and timeline by an amount determined by each publisher. Project failure can have severe consequences from halting the sponsor's ability to ship product for weeks (When bad things happen to good projects, CIO Magazine, Dec. 1, 2004) to almost bringing large organizations to their knees (AT&T Wireless self destructs, CIO Magazine, Apr. 15, 2004). According to the Standish Group, IT projects wasted $55 billion out of a total of $255 billion spent in 2002. Despite the huge cost associated with this high reported project failure rate, organizations feel compelled to undertake enterprise projects because the benefits can range from preventing an organization from failing to transforming an organization's fortunes. Since both the potential benefits and the potential failure rates are so high, failure prevention strategies are essential for any organization undertaking an enterprise project.

Organizations often implement failure prevention strategies by developing a risk management plan. According to the Project Management Institute (PMI), project risk is an uncertain event that, if it occurs, has a positive or negative effect on a project objective. The Project Management Institute is the leading global association for the project management profession. It creates project management standards and techniques and publishes The Project Management Body of Knowledge (PMBOK). This is an internationally recognized standard (IEEE, ANSI) that teaches the application of knowledge, skills, tools, and techniques to achieve project objectives.

For any given project, one of the responsibilities of the project team is to identify, analyze and mitigate risks. In addition, as the project progresses, the project team must monitor and control risks to maximize the probability of project success. The project team can use a number of techniques to manage risks including risk avoidance, risk transference, risk acceptance and risk mitigation. For example, the project team can change the project plan to avoid risks, transfer risk by subcontracting project activities to a more proficient third party, accept the risk by developing a contingency plan and mitigate the risk by taking actions to reduce the probability of the risk occurring or by reducing the impact of the risk event.

One example of a risk avoidance technique is to change the sequence of tasks in a project plan that may increase the total number of tasks and even increase the cost but will eliminate the need to perform the identified high-risk task. One example of a risk transfer technique is to subcontract the least predictable deliverables to a more proficient third party. For example, instead of accepting the risk of installing a complex software application, the project organization can subcontract the installation task to the vendor of the software application. The expectation is that the installation of the software is a lower risk activity for the software vendor who, for that software installation, is likely to have more experience, more knowledge and a higher skill set than the project organization. Engaging that software vendor under a fixed priced contract will also transfer cost risk for the installation activities from the project organization to the software vendor. In addition, if the fixed price contract is based on the required deliverables then that will help minimize the variability in scope and quality of the installation activities. One example of a risk acceptance technique is to accept that all project deliverables may not be completed on time. However, an appropriate risk mitigation technique is to add a time and cost contingency for all project deliverables where a risk acceptance technique has been applied. An additional risk mitigation technique is to manage the variability of the timeline for key project deliverables by controlling the completion time of said key project deliverables within the predetermined contingency. One additional benefit of being able to control the completion time of key project deliverables within a predetermined contingency is that the project timeline becomes substantially predictable and the associated cost of project services, including project management services, can become substantially fixed.

Accepting risk then applying controlling techniques to limit the variability within a predetermined contingency is a standard operating procedure for manufacturing processes. In fact, many manufacturers use statistical process control techniques to monitor the vital signs of their manufacturing process. The manufacturer uses these vital signs as an early warning system of possible risk events then they avoid the risk event by implementing corrective actions whenever any of those vital signs appear to be heading outside a predetermined control limit. The objective is to monitor performance and take corrective actions to keep the process under control.

In general, statistical process control is a method of monitoring a process during its operation in order to control the quality of the output while it is being produced—rather than relying on inspection to find problems after the fact. It involves gathering information about the process on a near real-time basis so that the operator can take action on the process. This is done in order to identify special causes of variation and identify other non-normal processing conditions, thus bringing the process under statistical control and reducing variation.

U.S. Pat. Nos. 5,956,251 and 5,581,466 teach process control systems that are applied to manufacturing processes but do not disclose the application of statistical process control techniques to project activities to provide access to objective project control data, facilitate project control activities, make project timelines substantially predictable, make the cost of project services substantially fixed, facilitate dynamic reallocation of project resources and indicate which project enablers are increasing project control and which are reducing project control. U.S. Pub. No. US 2006/0259336 teaches a risk management technique that includes building a library of common project activities and associating risk management information with each activity that can be shared and leveraged by different stakeholders. U.S. Pub. No. US 2002/0138318 teaches a risk management technique that includes tracking the occurrence of risk events then applying centrally managed mitigation strategies that change the project plan. U.S. Pub. No. US 2009/0222275 teaches a risk management technique that includes using risk information associated with sub tasks to determine the optimal schedule for dependent tasks in order to minimize variability of parent tasks. Organizations use a plurality of other risk reporting techniques including scorecards (U.S. Pub. No. 2009/0076867) that include key performance indicators and also risk ranking and rating systems (U.S. Pub. No. 2005/0065754). None of these disclosures teach the application of statistical process control techniques to project activities to provide access to objective project control data, facilitate project control activities, make project timelines substantially predictable, make the cost of project services substantially fixed, facilitate dynamic reallocation of project resources and indicate which project enablers are increasing project control and which are reducing project control.

U.S. Pub. No. 2003/0236692 teaches a workforce management system that uses a plurality of parameters to optimize the assignment of personnel to project positions. It does not disclose the application of statistical process control techniques to project activities to provide access to objective project control data, facilitate project control activities, make project timelines substantially predictable, make the cost of project services substantially fixed, facilitate dynamic reallocation of project resources and indicate which project enablers are increasing project control and which are reducing project control.

The aforementioned systems have a number of deficiencies including the inability to use statistical process control techniques to manage execution risk by tracking and reporting the completion of planned tasks and unplanned actions then implementing mitigating activities to ensure key project activities are completed within their predetermined contingency for timeline and cost. This approach to managing execution risk would significantly increase the probability of completing key project activities on schedule and within budget thereby enabling project resources to plan their participation in a project more accurately and complete their responsibilities within the allocated contingency for time and cost. This, in turn, would reduce the risk of cost and time overruns and therefore increase the willingness of subcontractors to provide fixed price project services including fixed price project management services.

Organizations try to manage project risk by compelling their project managers to develop detailed project plans and by instituting a range of project management procedures that range from project discovery and project initiation to project operation and project closure. However, if the project plan and the project procedures are not executed effectively then the project can quickly spin out of control and head toward failure. The project management office (PMO) in many organizations is therefore frustrated by their inability to access objective project execution data in near real time (defined as within 24 hours to 1 week for the present invention) without burdening the project with excessive management reporting that does not contribute to completing the project's deliverables. The ideal situation is to use information, which is a normal work product of a project, to predict whether the project's deliverables will be completed on time and within the allocated contingency for cost and timeline. Given that even well-planned projects can quickly spin out of control; measurement, reporting and mitigation of the execution of key project activities must be formalized and performed in near real time in order for the project organization to implement timely corrective activities.

Accordingly, there is a need for a system that limits timeline variability for key project deliverables and provides access to objective project control data, facilitates project control activities, helps make project timelines substantially predictable, helps make the cost of project services substantially fixed, facilitates dynamic reallocation of project resources and indicates which project enablers are increasing project control and which are reducing project control.

The applicant is not aware of any other commercially viable system that addresses the shortcomings of the prior art and also includes the features stated above. It is therefore an object of the present invention to set forth a system that enables an organization to measure, report and mitigate the completion of planned and unplanned project activities in near real time (defined as within 24 hours to 1 week for the present invention).

It is another object of the present invention to measure, report and manage the number and importance of planned and unplanned project activities in near real time.

It is yet another object of the present invention to measure, report and manage, in near real time, whether the number of planned and unplanned project activities is increasing or decreasing.

It is a further object of the present invention to measure, report and manage, in near real time, unscheduled project activities. It is another object of the present invention to measure, report and manage, in near real time, activities associated with unauthorized project activities.

It is object of the present invention to monitor the timeline performance for project stages and take corrective actions to keep each project stage under control.

It is another object of the present invention to make project timelines substantially predictable and the associated cost of project services, including project management services, substantially fixed.

It is yet another object of the present invention to increase the transparency of information about project activities. This information will be made readily available to management with less filtering caused by organizational and personal bias. The project team will enter all key project activities into the present invention and update the status of those project activities in near real time. Project team members have an inherent incentive to keep this information current because it is their responsibility to report and manage risks in their area of responsibility. If a risk event occurs and that risk was not identified or mitigated effectively by the responsible project resource then that project resource will have to answer to management. It is therefore an object of the present invention to encourage project resources to record objective project control information that is unfiltered by organizational and resource bias and make that information available to organizational management in near real time.

It is a further object of the present invention to provide access to objective project control data in near real time without burdening the project with excessive management reporting that does not contribute to completing the project's deliverables.

It is an object of the present invention to provide project control reports that transform raw project activity data into concise management reports that clearly reveal the source and impact of project control issues.

It is another object of the present invention to enable organizational management to use project control information and reports to determine which stages of a project are in control and which stages of a project are out of control.

It is yet another object of the present invention to enable organizational management to use project control information and reports to determine which project enablers are driving project stages out of control and which project enablers are contributing to bringing project stages under control. It is another object of the present invention to capture much of this information directly from project team members and better understand the cause and effects of control trends then diagnose and link said causes and effects then recommend a corrective plan. Enablers are the causes and project results, such as over budget and late completion, are the effects.

It is a further object of the present invention to enable organizational management to use project control information to dynamically allocate resources among projects as the relative level of control changes over time for different projects.

BRIEF SUMMARY OF THE PRESENT INVENTION

The present invention enables organizations to:
1. Capture information about project activities.
2. Assign meta data to the captured project activities.
3. Update the status of the project activities and associated meta data.
4. Create reports that include information about project activities and their pre-determined control limits.
5. Produce reports that increase the transparency of information about the project activities and minimize organizational and personal bias in the data.
6. Produce reports that help organizations determine which aspects of the project are trending in control and which aspects of the project are trending out of control.
7. Produce reports that help organizations determine which project enablers help increase project control and which project enablers help reduce project control.
8. Produce reports that help organizations improve the allocation of resources across projects.
9. Produce reports that help subcontractors and shared service organizations provide fixed priced services to the project organization, including fixed priced project management services.

BRIEF DESCRIPTION OF THE DRAWINGS

The novel features believed characteristic of the invention are set forth in the appended claims. The invention itself, however, as well as a first mode of use, further objectives and advantages thereof, will best be understood by reference to the following detailed description of an illustrative embodiment when read in conjunction with the accompanying drawings, wherein:

FIG. 1 illustrates a first embodiment of an overview of the present invention.

FIG. 2 illustrates a first embodiment of the system architecture of the present invention.

FIG. 13 illustrates a first embodiment of the project activity form for the present invention.

FIG. 14 illustrates a first embodiment of the risk form for the present invention.

FIG. 15 illustrates a first embodiment of the report that illustrates the average grade for key project performance measures and key project enablers.

FIG. 17 illustrates a first embodiment of a form that enables users to define a causal link between project enablers and project performance measures.

FIG. 18 illustrates a first embodiment of a report that lists recommended corrective actions.

FIG. 19 illustrates a first embodiment of a project control chart.

DETAILED DESCRIPTION OF THE INVENTION

Figure 3:
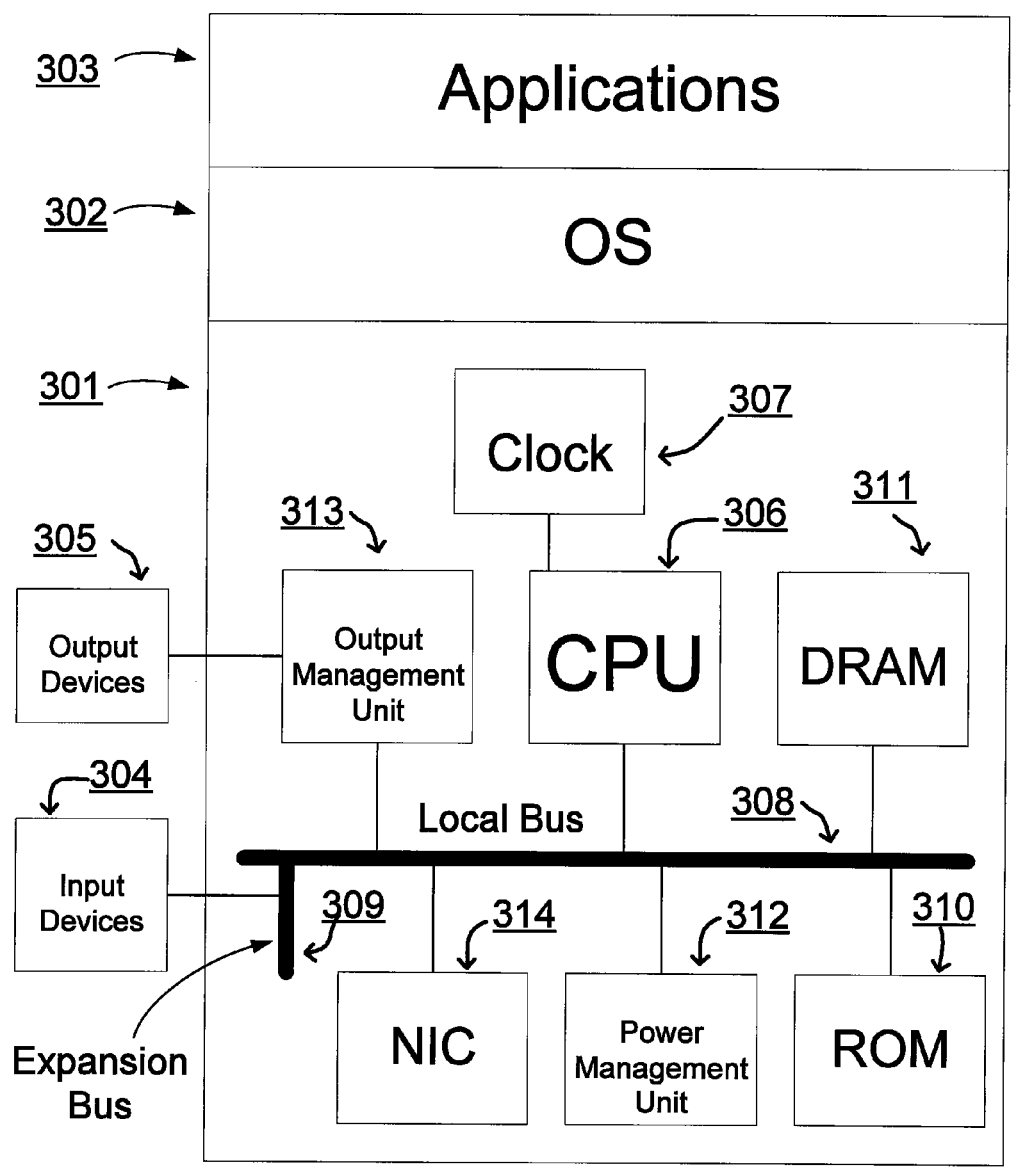
FIG. 3 illustrates a first embodiment of the technical platform for the central control system of the present invention.

With reference to the figures, exemplary diagrams of key components of the present invention are provided in which illustrative embodiments may be implemented. It should be appreciated that these figures are only exemplary and are not intended to assert or imply any limitation with regard to the components in which different embodiments may be implemented. Many modifications to the depicted components may be made.

System Overview

In an overview of the first embodiment illustrated in FIG. 1, the present invention provides a method and apparatus for organizations to enable members of each project team to enter project activities and associated meta data into the present invention 101. It also enables members of each project team to update existing project activities and associated meta data in the present invention.

A reviewer worker will review each new and updated project activity and its associated meta data before updating and approving that project activity 102.

A meta data worker will then review the existing meta data and add additional meta data to each new and updated project activity 103.

An authorization worker will then authorize the new or updated project activity for use in reports 104.

The reporting worker will then update the reports if necessary then make the reports available for use 105.

Each of the worker roles, described in the system overview above, may be shared by multiple members of the project team. In addition, a single member of the project team may be responsible for multiple worker roles.

FIG. 2 illustrates the system architecture of a first embodiment of the apparatus and method of the present invention.

The central control system ("CCS") 201 is operatively coupled to a plurality of other systems and user interfaces. Operative coupling is the preferred method to exchange information between systems. In the present invention, the systems are inter-connected via a combination of wide area networks including the public switched telephone network, local area networks, such as an Ethernet network, token ring networks and wireless networks. Most systems, such as modern computers, include a built in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems they specify the pre-determined location of the required information in the source system's database and the pre-determined location for that information in the destination system's database. The engineers also specify the pre-determined frequency of information transfer (e.g., continuous, every day at 10:00 PM PT, etc.), the pre-determined format to use (e.g., synchronous, flat file Extract Transform Load "ETL", etc.) and the pre-determined error checking protocol to use. The combination of network connectivity and the configuration of the communication method by installation engineers enable systems to be operatively coupled to the CCS.

The user interfaces are operatively coupled to the central control system 201. The different types of workers access the CCS through an external user interface 202 or an internal user interface 209. Each external user interface is connected to the CCS through a public network such as the Internet. Each internal user interface is connected to the CCS through a private network such as an ethernet owned by the project organization. The user interfaces are the input and output gateways for communications with the CCS.

The data storage system 210 is operatively coupled to the CCS. The data storage system stores the plurality of data used by the present invention.

The business intelligence system 211 is operatively coupled to the CCS. The business intelligence system calculates and stores a plurality of information about trends, patterns and relationships that exist in the databases used by the present invention.

The workflow management system 212 is operatively coupled to the CCS. The workflow management system guides members of the project team through the series of questions, answer options and statements that comprise the project organization's preferred method to input project activities and their associated meta data.

The external user interface 202 includes a computer 203 and a modem 204. The internal user interface 209 includes a computer 213 and a network interface card ("NIC") 214. Many companies make computers that a project team member, referred to as a user, can use to access the CCS including Hewlett Packard, Gateway and Toshiba. In addition, many companies make modems that can connect to the CCS including 3Com Corp., D-Link Systems, Inc., and US Robotics. The user's computer is connected to the CCS via the modem and a global public network 205, such as the Internet, or via a network interface card and a private network 208. The user's modem can be connected to the CCS using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 201 includes a local area network 208 that is connected to the global public network 205 via a network interface unit ("NIU") 207 and a firewall 206. The firewall controls the type of information that can enter the CCS from the outside world and also controls the type of information that can leave the CCS. It blocks unauthorized access while permitting authorized communications. Many companies make firewalls that can be used by the CCS including Juniper, SonicWall and WatchGuard. The installation engineer who represents the project organization installs the firewall. The installation engineer also configures the firewall to allow desired information to enter and leave the CCS and to prevent undesired information from entering and leaving the CCS. The CCS is also connected to other systems via the local area network 208 including the data storage system ("DSS") 210, business intelligence system ("BIS") 211, and workflow management system ("WMS") 212.

FIG. 3 illustrates the key components of the CCS in a first embodiment of the apparatus and method of the present invention.

The "CCS" includes a number of key components including the main hardware 301, the operating system 302, software applications 303, input devices 304 and output devices 305. The operating system 302 is the interface between the software applications and the hardware. It controls the execution of computer applications and provides services to those applications. The first embodiment of the present invention can use one of a plurality of standard commercial operating systems, such as Microsoft windows and UNIX. The software applications 303 include software tools such as commercial anti virus software available from companies such as McAfee and Norton; a browser, such as Microsoft Internet Explorer; a word processor, such as Microsoft Word; a spreadsheet, such as Microsoft Excel; and a database, such as Microsoft Access. Input devices 304 include a plurality of commercial options such as a keyboard, a camera, a mouse, and a microphone. Output devices 305 include a plurality of commercial options such as a monitor and speakers. These standard commercial input devices 304 and output devices 305 are available from a plurality of vendors such as CompUSA and Office Depot.

The main hardware 301 in the CCS can be a conventional personal computer or a conventional server with sufficient memory and processing power. To one skilled in the art, it will be evident that the functionality of the CCS can be distributed over multiple inter-connected personal computers or multiple inter-connected servers. The main hardware includes a number of key components including the central processing unit ("CPU") 306, clock 307, local bus 308, expansion bus 309, read only memory ("ROM") 310, dynamic random access memory ("DRAM") 311, power management unit 312, output management unit 313, and network interface card 314.

The central processing unit ("CPU") 306 is the component of the CCS that performs most of the data processing. It interprets instructions, performs logical and arithmetic operations on data, and controls input and output functions. The first embodiment of the present invention can use a commercial CPU from a plurality of vendors, such as a Pentium 4 supplied by Intel and x4 9850 supplied by AMD. The clock 307 regulates the rate at which the CPU processes instructions. The CCS also uses the clock to synchronize the operation of its key components. A CPU such as a Pentium 4 can operate at a clock speed of 3.4 GHz. The CCS uses the local bus 308 to inter-connect its key components. These key components exchange data via the local bus. The CCS uses the expansion bus 309 to enable expansion cards to exchange data with the CPU and memory. Examples of commercial expansion cards are sound cards and graphics cards. The expansion bus also enables input devices 304, such as a mouse, to input data that can be used by the key components of the CCS. The read only memory ("ROM") 310 includes the instructions that the CPU executes to perform its basic operations. The vendor of the computer platform that comprises the hardware component of the CCS also provides the instructions that are stored in the ROM. When the CCS's power is removed then restored, the instructions in the ROM remain unchanged. The dynamic random access memory ("DRAM") 311 includes instructions that the CPU executes to perform selected tasks. The DRAM also stores the data that is used by the instructions executed by the CPU. When the CCS's power is removed then restored, the information in the DRAM is lost. The CCS uses the power management unit 312 to supply and regulate the power required to operate the key components of the CCS. The CCS uses the output management unit 313 to interface with output devices, such as a monitor. The vendor of the computer platform, which is used by the CCS, provides the local bus, expansion bus, ROM, DRAM, power management unit, CPU, clock, NIC and output management unit. Specific components can be obtained from alternate commercial vendors including CompUSA and Office Depot.

Figure 4:
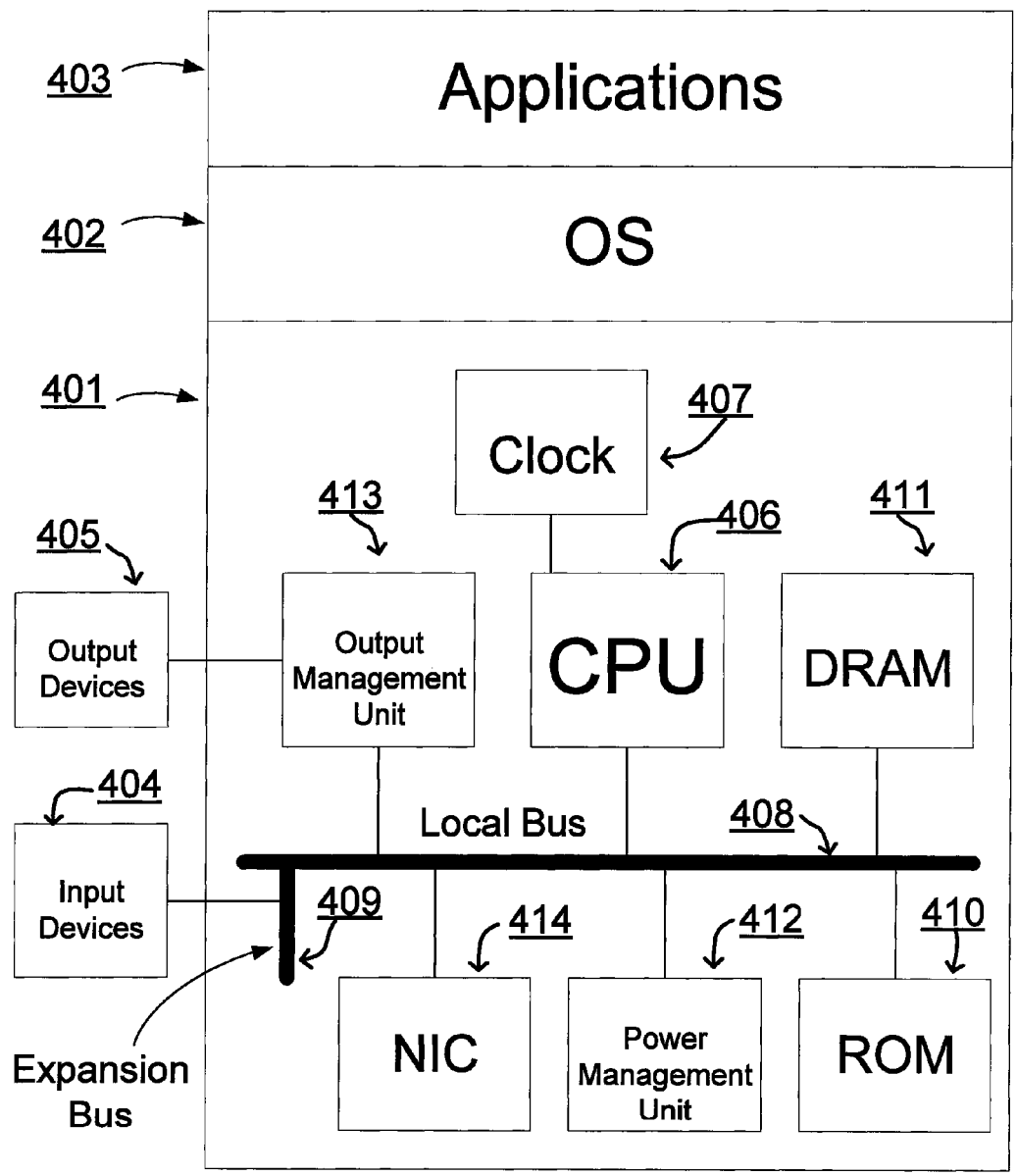
FIG. 4 illustrates a first embodiment of the user interface to the present invention.

FIG. 4 illustrates the key components of the user interface in a first embodiment of the apparatus and method of the present invention.

In a first embodiment of the present invention the user interface device 202 and 209 is a conventional personal computer that includes, the main hardware 401, the operating system 402, software applications 403, input devices 404 and output devices 405. The main hardware 401 in the user interface device includes a number of key components including the central processing unit ("CPU") 406, clock 407, local bus 408, expansion bus 409, read only memory ("ROM") 410, dynamic random access memory ("DRAM") 411, power management unit 412 and output management unit 413. These components are substantially the same as the similarly named components in the CCS as illustrated in FIG. 3. They also perform substantially the same functionality and are available from the same vendors. The key differences are that the components in the CCS have higher performance requirements than the equivalent components in the user interface device. In addition, the user interface device includes more commercial software applications such as a browser, word processor application, a design application, a spreadsheet and a database application. An example of a browser that can be used by the present invention is Microsoft Internet Explorer. An example of a word processor application that can be used by the present invention is Microsoft Word. An example of a design application that can be used by the present invention is Microsoft Visio. An example of a spreadsheet application that can be used by the present invention is Microsoft Excel. An example of a database application that can be used by the present invention is Microsoft Access. Examples of higher performance components for the CCS are a faster clock speed, a more powerful CPU and higher capacity DRAM.

Figure 5:
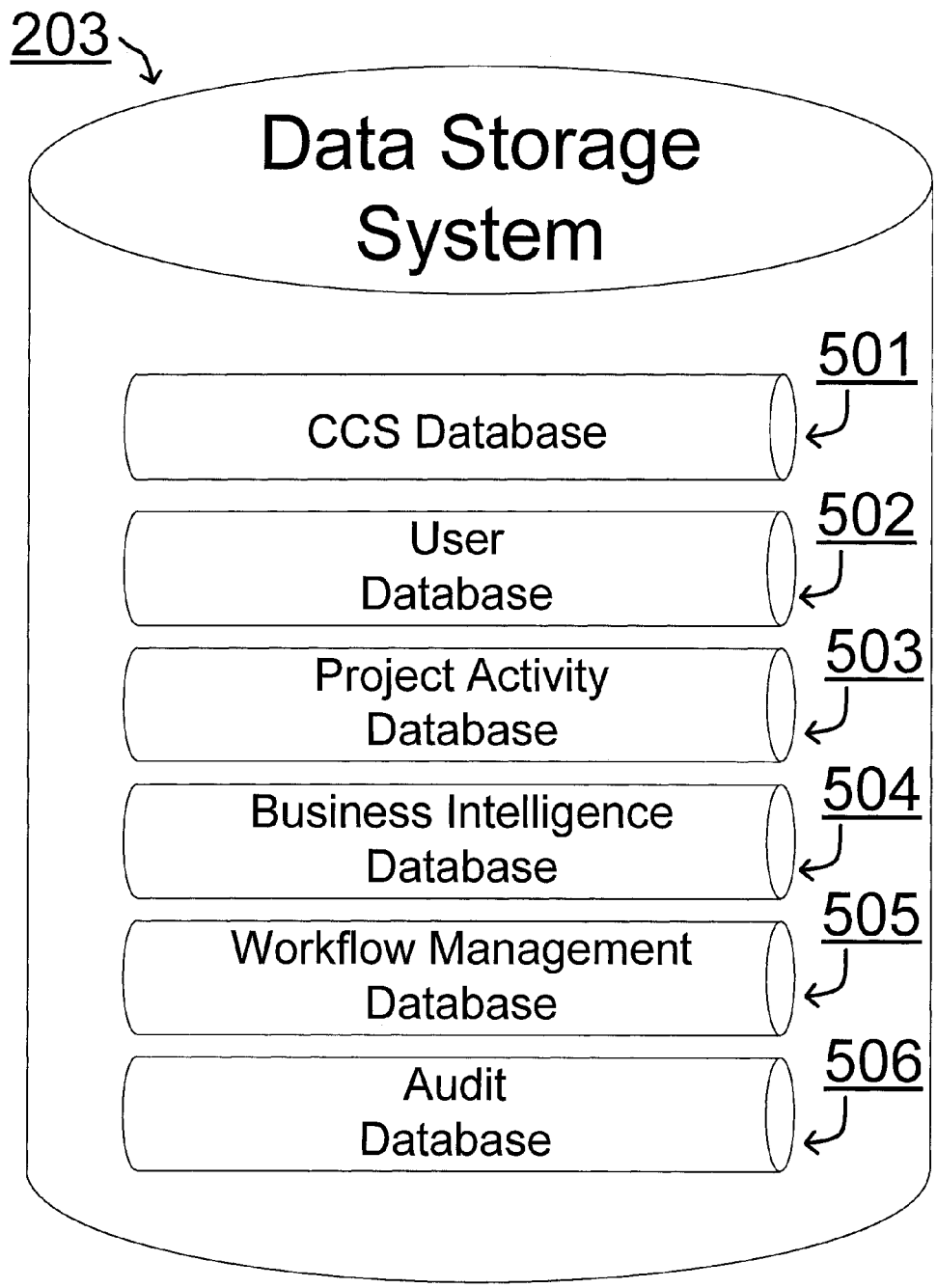
FIG. 5 illustrates a first embodiment of the data storage system ("DSS") for the present invention.

FIG. 5 illustrates the key components of the data storage system in a first embodiment of the apparatus and method of the present invention.

The data storage system 203 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, Iomega, and Hitachi. The data storage system is comprised of a plurality of databases that are described below. The present invention can use one of a plurality of database systems to house the databases including Oracle and SQL database systems.

The CCS uses the CCS database 501 to store information about how users are using of the CCS. The CCS database contains a plurality of fields including a unique reference key for each record in the CCS database, the unique reference key of each worker who has logged into the CCS and tracking information about the functions of the CCS used by each worker on each login.

The CCS uses the user database 502 to store information about users. For each user, the user database contains a plurality of fields including a unique reference key for each record in the user database, the user's name, location, contact phone numbers, email address, resume, role, login credentials for the CCS and the unique reference key for the user's manager.

The CCS uses the project activity database 503 to store information about project activities. For each project activity, the project activity database contains a plurality of fields that contain information about the project activity. These fields include information about the project activity including a project activity summary, project activity risk, project activity resources, project activity status, project activity scope, project activity schedule, project activity cost, project activity reports, project activity categories, project activity comments and user defined fields.

The general project activity fields include a unique reference key for each record in the project activity database, a summary of the project activity, the unique reference key of a parent project activity if the project activity is a sub-activity and the unique reference keys of any dependent project activities.

The embodiment of the risk form illustrated in FIG. 14 represents a sub-set of the total fields available in the default risk form. The project activity risk fields include a risk condition 1401 for the project activity, the probability that the risk will occur 1405, a summary of the organizational impact 1402 of the project activity, a summary of a proposed mitigation plan 1403 for each risk and a summary of a proposed contingency plan 1404 to accommodate each risk. The project organization can use the form designer described below to change the fields in the project activity risk form.

The project activity resources fields include the party responsible for the project activity, the date the project activity was assigned to the responsible party, the organizational group of the responsible party, project role of the responsible party, the originator of the project activity, the party who last updated the project activity, the party who completed the project activity and the parties to be alerted when the status of the project activity changes.

The project activity status fields include the current status of the project activity (open, closed), the date the status was last updated, the criticality of the project activity (high, medium low), the proposed resolution for the project activity, the current disposition of the project activity, the percent completion of the project activity, the planned value of the project activity and the earned value of the project activity.

The project activity scope fields include the project deliverables impacted by the project activity and the type of deliverable impacted (e.g., document, software installation, etc.).

The project activity schedule fields include the date the project activity was first entered into the database, the last date that the project activity record was updated, the target date for the next update, the planned start date for the project activity, the actual start date for the project activity, the planned end date for the project activity (e.g., due date), the actual end date for the project activity, the planned duration of the project activity, the actual duration of the project activity, the type of estimate (order of magnitude, budgetary, definitive, etc.), the schedule variance and the schedule performance index (SPI).

The project activity cost fields include the budgeted cost for the project activity, the actual cost incurred to date on the project activity, the actual cost incurred to complete the project activity, the budgeted hours for the project activity, the actual hours consumed to date on the project activity and the actual hours used to complete the project activity.

The project activity reports fields include the project activity viewing field (approved for viewing—yes or no) and the project activity reporting field (authorized for reporting—yes or no). The project organization will have pre-determined criteria that the meta data worker will apply when making the decisions about whether the project activity is ready for viewing and reporting. For example, a project organization may specify that when a minimum set of fields are validated for a project activity, such as the summary and due date, then the meta data worker can approve that project activity for viewing. In addition, a project organization may specify that when all of the meta data has been entered and is complete then the meta data worker can authorize that project activity for use in reports.

The project activity category fields include the project name, the project ID, the project type, project stages impacted by the project activity, the next stage after the impacted project stage, the organizational workflows impacted by the project activity, the organizational procedures impacted by the project activity, the organizational systems impacted by the project activity, the shared services that impact the project activity, the work breakdown structure ID for the project activity, the parent work breakdown structure ID if any, the PMI Process for the project activity, the PMI project group for the project activity and the PMI knowledge area for the project activity.

The project activity database also includes a comments field and a number of user-defined fields that the project organization can use as required. For example, a project organization may have a unique reference code for each project that users can enter into one of the user-defined fields. Other than the summary of the project activity, the other fields in the project activity database represent the meta data associated with each project activity.

The project organization determines which fields it will use when using the present invention. A project organization may choose to use a subset of the fields listed above such as the date the project activity was first entered (e.g., the origination date), a summary of the project activity, the planned end date for the project activity (e.g., due date) and the party responsible for the project activity. Conversely, another project organization may choose to use all of the fields listed above and add its own fields by also using the user-defined fields. One skilled in the art will therefore appreciate that the fields listed above do not assert or imply any limitation with regard to the possible embodiments of the present invention.

The CCS uses the business intelligence database 504 to store key business intelligence data and reports. The business intelligence system has its own database that is described below. For each report, the business intelligence database contains a plurality of fields including a unique reference key for each record in the business intelligence database, a name for the report and a description of the report.

The CCS uses the workflow management database 505 to store information about the workflow that is the preferred method to enter and update a project activity. The WMS database is also used to capture information from the project enabler workflow. The workflow management system has its own database that is described below. For each workflow, the workflow management database contains a plurality of fields including a unique reference key for each record in the workflow management database, a name for the workflow and a description of the workflow.

The CCS uses the audit database 506 to store information about each action performed by each user in the CCS. The audit database contains a plurality of fields including a unique reference key for each record in the audit database, the action performed in the CCS, the unique reference key for the user who performed the action and the date and time that the action was performed. The information in the audit database enables each transaction to be reconstructed and analyzed for audit purposes.

Figure 6:
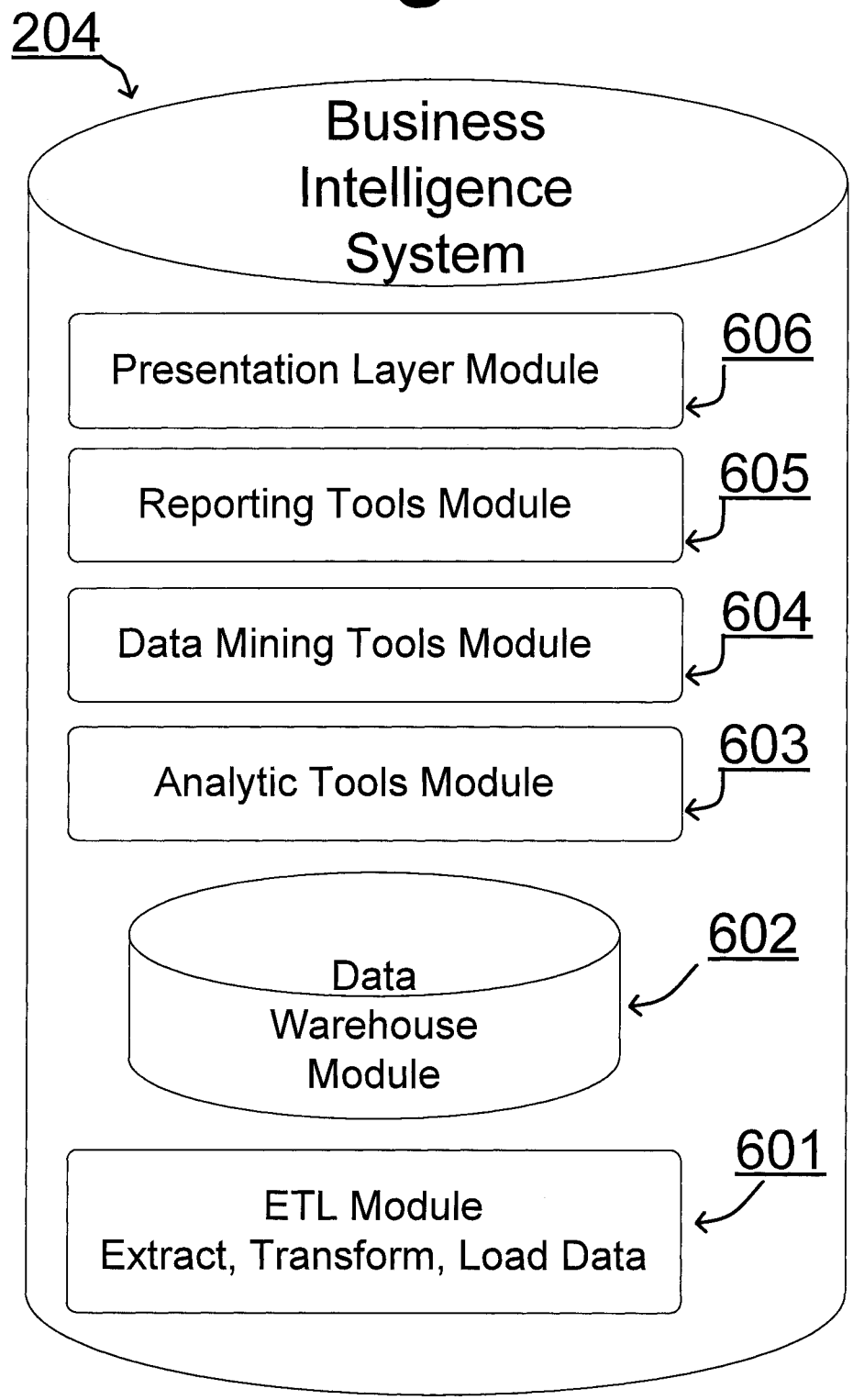
FIG. 6 illustrates a first embodiment of the business intelligence system ("BIS") of the present invention.

FIG. 6 illustrates the key components of the business intelligence system ("BIS") in a first embodiment of the apparatus and method of the present invention.

The BIS 204 is operatively coupled to the CCS. Many companies supply business intelligence systems that can be used by the present invention including Microstrategy and Oracle. The CCS uses the BIS to analyze data stored in the plurality of databases that comprise the data storage system. The purpose of the analysis by the BIS is to identify trends, patterns and relationships that may be hidden in the data stored in the data storage system.

Example trends include the types of project activities that are being entered by different users and how this is changing over time. Trends can have a plurality of causes, such as the rapid growth of the project organization that can lead to a growth in the number of project activities. In addition, the project organization may deploy a new process or deploy a new technology that is used by a shared service. For example, the project organization may roll out a new procedure to start projects and install a new system to manage project change requests. This may cause a plurality of new project activities across projects thereby realizing a trend. An example of a pattern is the increase in the percentage of specific types of project activites at certain times of the year. The cause of such a pattern may be the extra workload during month-end and year-end periods. An example of a relationship is that a certain type of project activity may cause subsequent project activities in impacted areas, such as in other organizational units impacted by the target project and in other projects impacted by the target project.

The present invention uses a commercial BIS 204 that is illustrated in FIG. 6. It includes a plurality of modules including an extract, transform and data load "ETL" module 601, a data warehouse module 602, an analytic tools module 603, a data mining module 604, a reporting tools module 605 and a presentation layer module 606. The main purpose of the BIS is to enable organizations to capture, process and analyze vast amounts of data from a plurality of sources then identify trends, patterns and relationships that can facilitate business decision-making.

The ETL module 601 is the interface between the BIS and the CCS. The main purpose of the ETL module is to transfer data from the CCS to the data warehouse. Using ETL tools to operatively couple a system, such as the BIS, to the CCS is explained above in the description of FIG. 2.

The data warehouse module 602 is a database built in a commercial storage system substantially the same as the data storage system described in FIG. 5. The data warehouse module contains a copy of a pre-determined subset of the total data that is available in the data storage system. For example, a pre-determined subset of the project activity database will be stored in the data warehouse. A business analyst in the project organization specifies the data in the data storage system that the present invention shall use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. Many vendors offer commercial data warehousing solutions including Hyperion, Microstrategy and Oracle.

The analytic tools module 603 includes standard on-line analytical processing (OLAP) functionality. OLAP software enables users to create various views and representations of data in the data warehouse. Each view or representation of data is created by configuring a business intelligence procedure in the analytic tools module. OLAP functionality enables a business analyst in the project organization to access, analyze and model business issues and share the information that is in the data warehouse. For example, the Business Analyst can model the variances in completion time for project activities. As these variances increase for a given project (e.g., completion of deliverables are increasingly delayed and/or more expensive), that project is heading out of control. Conversely, as these variances decrease, the completion of project deliverables will become more predictable and the project will trend into control. Many vendors offer commercial data warehousing and OLAP solutions including Hyperion, Microstrategy and Oracle. The OLAP council creates OLAP standards.

The data mining tools module 604 enables a business analyst in the project organization to discover trends, patterns and relationships in the data stored in the data warehouse module. Data mining software is designed to analyze large volumes of data using sophisticated data search techniques then apply statistical methods to discover trends, patterns and relationships in the data. For example, the Business Analyst can use the data mining software to determine whether all projects for a particular enabler, such as a project manager, are trending out of control. The data mining system can reveal cause and effect relationships that can help the Business Analyst recommend corrective action, such as more training for the project manager. Many vendors offer commercial data mining software including Baan Software, Oracle, SAP, Sybase and Tableau Software. The Data Mining Group is an independent, vendor led consortium that develops data mining standards.

The reporting tools module 605 enables a business analyst in the project organization to create reports that display the data stored in the data warehouse as well as displaying information that illustrates the trends, patterns and relationships in the data stored in the data warehouse module. Example, reports are illustrated in FIG. 15 and FIG. 19. Many vendors offer commercial reporting software including Business Objects, Cognos, Crystal Reports and Microstrategy.

The presentation layer module 606 includes graphics and multimedia interfaces that enable information and reports to be displayed in a user-friendly manner. The reporting tools described above all include a presentation layer module.

In the present invention a plurality of default reports are made available to the project organization. These reports compare and count meta data values and also apply other pre-determined calculations to meta data values to reveal useful business information such as whether a project activity is past its due date. For example, if a project activity is not complete and its target completion date is earlier than the current date then that project activity is past due. The present invention also allows the project organization to create its own reports. However, the default reports include the number of past due activities, the rate of change of the number of past due activities, the number of unplanned activities, the rate of change of the number of unplanned activities, the number of unscheduled and unauthorized activities that have started, the rate of change of the number of unscheduled and unauthorized activities, and the level of control for resources, roles, project procedures, shared services, functional groups, project deliverables and project stages. For each report, the business analysts can specify the control limit that helps determine whether the project enabler is in control or out of control. For example, if one person has a plurality of project activities that are past due and that number exceeds the pre-determined control limit set by the project organization (10 say) then the reports will indicate that that project enabler (e.g., the project team member) is responsible for an aspect of the project that is out of control. However, for a given report the business analyst can specify different control limits for different situations. For example, for a given report, the business analyst may specify tighter control limits for an engineering project compared with a marketing project if that is consistent with the needs of the project organization. As members of the project team add project activities to the project activity database, the added data will be displayed in the reports and those reports will reveal trends, patterns and relationships. The project organization can then use that information to take the corrective actions required to maintain project control. For example, if the number of past due activities exceeds the pre-determined control limit for a specific project team member then additional training or additional resources may be required.

The lateness of past due activities is measured by comparing the target completion time with the actual completion time for project activities. The rate of change of the lateness of past due activities is measured by comparing the average lateness of project activities over time. The number of unplanned activities is measured by counting the number of actions that are required that were not in the original project plan. The rate of change of the number of unplanned activities is measured by comparing the number of unplanned activities over time. The number of unscheduled and unauthorized activities is measured by counting the number of actions that were started that were not scheduled or authorized. The rate of change of the number of unscheduled and unauthorized activities is measured by comparing the number of unscheduled and unauthorized activities over time. The measure of control for a resource is determined by calculating the percentage by which the target completion time and cost is exceeded for each project activity that is impacted by that resource. A similar measurement method is used to determine the level of control of other project enablers.

This list of reports is not intended to assert or imply any limitation on the number or type of reports that can be provided by the present invention.

Figure 7:
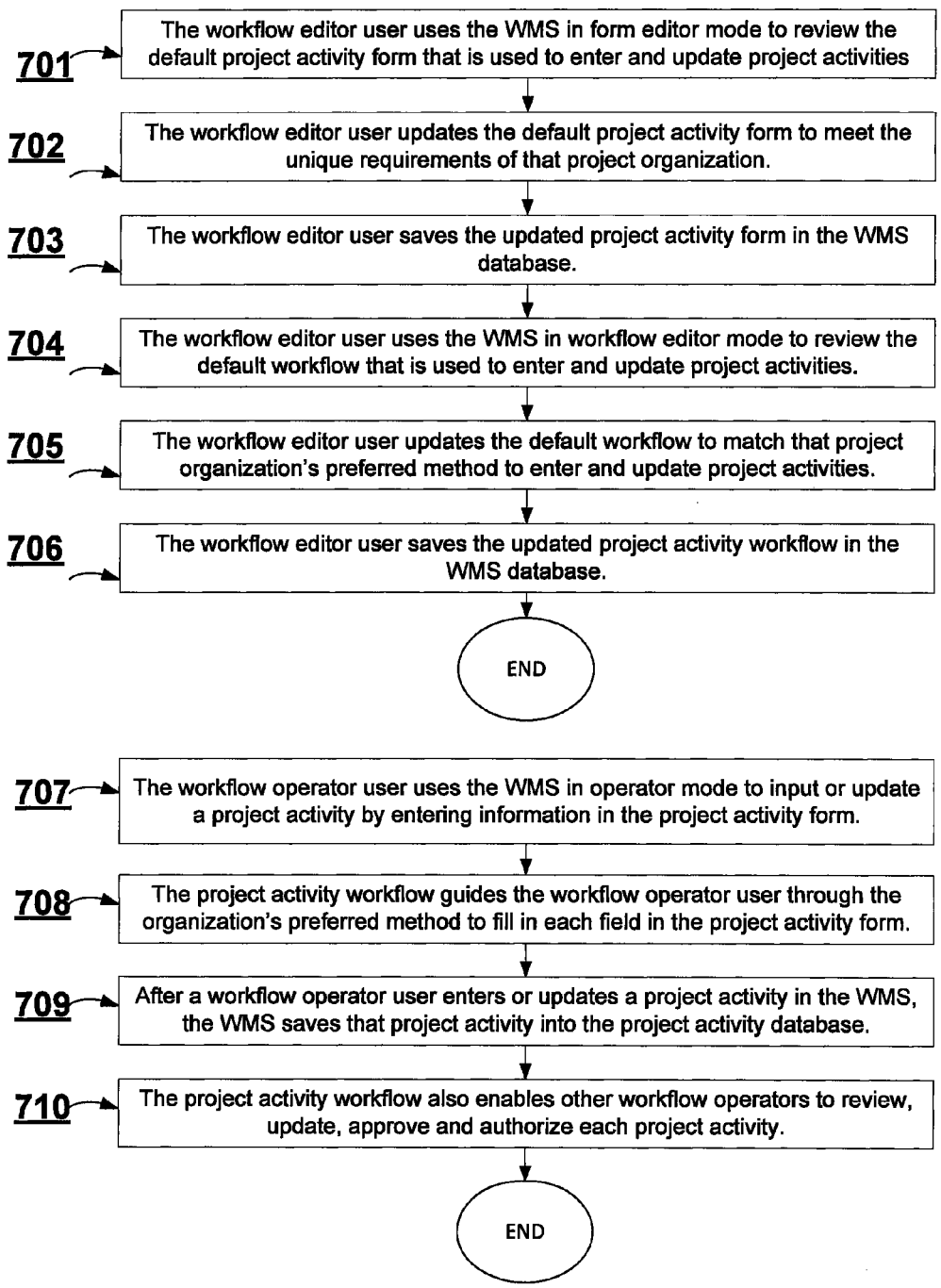
FIG. 7 illustrates a first embodiment of the overview of the workflow management system ("WMS") of the present invention.

FIG. 7 illustrates an overview of the Workflow Management System in a first embodiment of the apparatus and method of the present invention.

The Workflow Management System ("WMS") 210 is operatively coupled to the CCS. The purpose of the WMS is to enable a project team member, who is not trained to input project activities, to enter and update project activities in accordance with the project organization's preferred method.

The workflow editor user logs into the WMS in form editor mode then reviews the default project activity form that is used to enter and update project activities 701. The workflow editor user may be a business analyst for the project organization.

The workflow editor user updates the default project activity form to meet the unique requirements of that project organization 702. For example, the workflow editor user may hide some fields in the project activity form that the project organization does not want to use.

The workflow editor user saves the updated project activity form in the WMS database 703.

The workflow editor user uses the WMS in workflow editor mode to review the default project activity workflow that is used to enter and update project activities 704.

The workflow editor user updates the default project activity workflow to match that project organization's preferred method to enter and update project activities 705.

The workflow editor user saves the updated project activity workflow in the WMS database 706.

FIG. 7 also illustrates the procedure to modify the default project activity workflow.

The workflow operator user uses the WMS in operator mode to input or update a project activity by entering information in the project activity form 707. The workflow operator user is a member of the project team who wants to enter or update a project activity.

The project activity workflow guides the workflow operator user through the organization's preferred method to fill in each field in the project activity form 708.

After a workflow operator user enters or updates a project activity in the WMS, the WMS saves that project activity into the project activity database 709.

The project activity workflow also enables other workflow operator users to review, update, approve and authorize each project activity 710. The other workflow operator users can use the present invention in the same manner as the workflow operator user who entered the project activity. The difference is that specific users are permitted to approve project activities for viewing and specific users are permitted to authorize project activities for use in reports. User permissions are based on their role in the project. The business analyst configures the roles for each user and their permissions at the time that each user is given access to the present invention.

Figure 8:
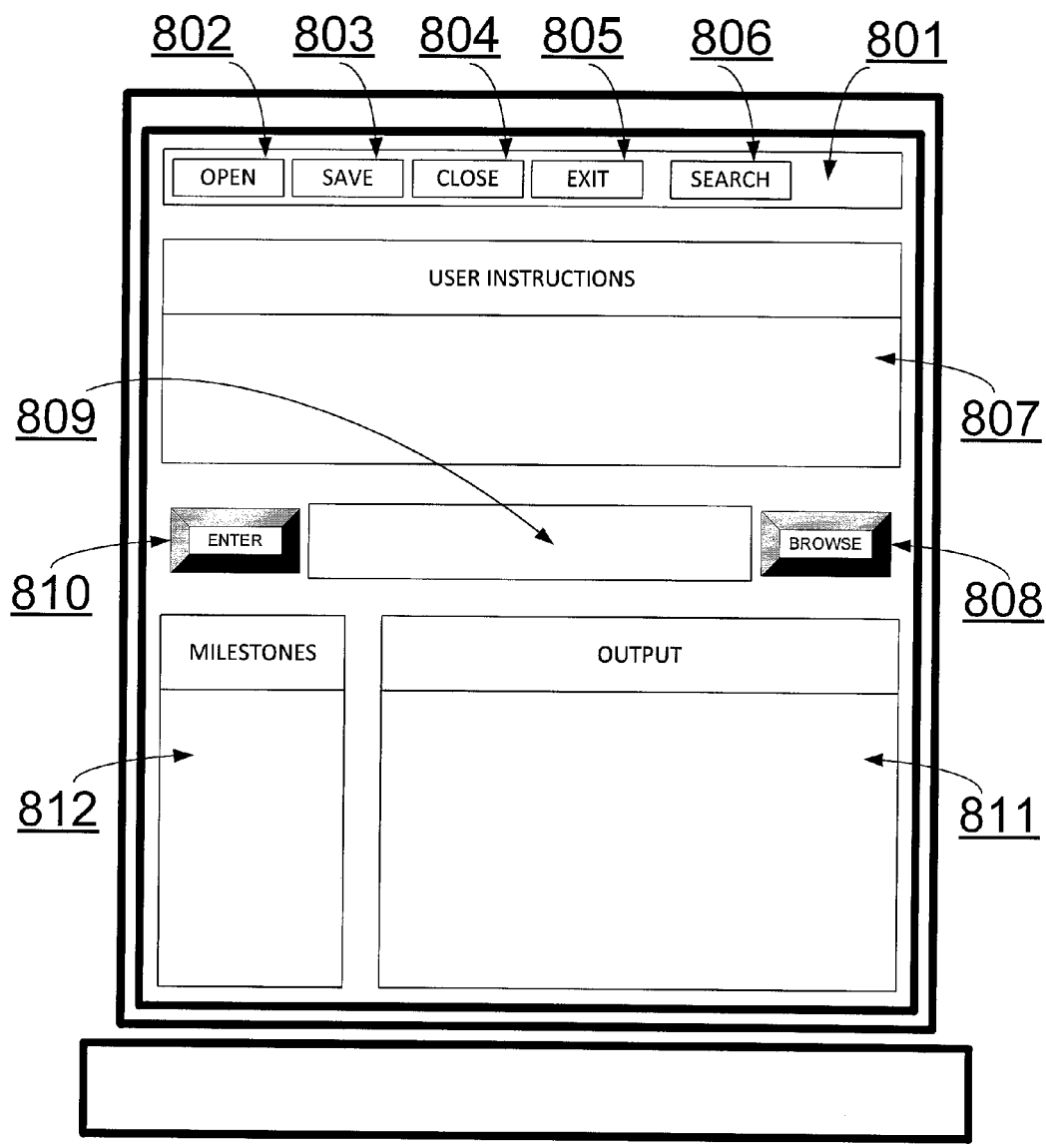
FIG. 8 illustrates a first embodiment of the workflow user interface for the WMS of the present invention.

FIG. 8 illustrates the user interface seen by the workflow operator user when using the WMS to enter or update a project activity. The key components of the user interface include the toolbar 801, the user instructions window 807, the browse button 808, the input window 809, the enter button 810, the output window 811 and the milestones window 812.

The toolbar includes a number of buttons including the open button 802, the save button 803, the close button 804, the exit button 805 and the search button 806. The open button enables the workflow operator user to open a project activity workflow. The save button enables the workflow operator user to save a project activity. The close button enables the workflow operator user to close the project activity workflow that is open. The exit button enables the workflow operator user to exit the WMS. The search button enables the workflow operator user to search for and locate a specific project activity workflow.

The purpose of the user instructions window 807 is to display instructions to the workflow operator user at each step in the workflow where the workflow operator user has to perform an action. An example is a step in the workflow where the workflow operator user must input information that the WMS will insert into one of the fields in the project activity form. For example, at the beginning of the workflow, the WMS will open the project activity form then display explanatory information in the user instructions window. When the project activity workflow reaches the step to input a summary of the project activity, the WMS will display, in the user instructions window, the following text "Please input a summary of the project activity". After the workflow operator user inputs the summary in the input window 809 then clicks the enter button on the screen 810, the WMS will transfer the summary from the input window to the "Summary" field in the project activity form that will be displayed in the output window 811.

The purpose of the browse button 808 is to enable the workflow operator user to search through the file system on the workflow operator user's computer to locate a file. For example, the workflow operator user can browse through the file system to locate a document then click the enter button on the screen 810 to input a link to that document in a user-defined field in the project activity form. The workflow editor user will have to modify the default project activity form and the default project activity workflow 705 to enable this functionality.

The purpose of the input window 809 is to receive inputs from the workflow operator user.

The purpose of the enter button 810 is to instruct the WMS to write the contents of the input window to the pre-determined field in the project activity form as specified by the "write" command configured at that step in the workflow. The write command is described below.

The purpose of the output window 811 is to display the project activity form.

The purpose of the milestones window 812 is to display a list of milestones in the workflow. When the workflow operator user clicks a milestone in the milestone window the WMS will display the user instructions for the field in the form that corresponds with the selected milestone. The default project activity workflow contains one milestone for each field in the project activity form.

The WMS 210 has a plurality of commands that the workflow editor user can use to create a workflow. These commands include audio, branch, clear, close, display, exit, input, log, menu, milestone, no action, open, pause, position, print, repeat, repeat end, run, save, setup, start, variable, video, and write. The manufacturer of the WMS can use one of a plurality computer programming languages to implement these commands, such as java, java script and visual basic.

The audio command enables the workflow to play an audio file. In the audio command, the workflow editor user specifies the path of the audio file to play.

The branch command enables the WMS to jump to a pre-determined command in the workflow. For example, the workflow editor user may include, in the workflow, a display command that displays the following instruction "Would you like to save the project activity displayed in the project activity form (Yes/No)?". This display command in the workflow may be followed by an input command. The workflow operator user can input, into the input window, "yes" or "no" then click the enter button on the screen. The workflow editor user will have configured the subsequent branch command to check the information in the input window. If the input from the workflow operator user was "no" then the workflow will go to the next command. If the input from the workflow operator user was "yes" then the workflow will go to the write command that will write the project activity from the project activity form into the project activity database. The workflow will then go to the next command.

The clear command enables the WMS to clear all information displayed in the windows (FIG. 8) that the workflow editor user had specified in the clear command. The workflow editor user can specify any window to clear including the user instructions window and the input window.

The close command enables the WMS to close a project activity form.

The display command enables the WMS to display information in a window such as the user instructions window. The information to display is pre-determined by the workflow editor user when that workflow editor user configures that display command in the workflow.

The exit command enables the workflow operator user to exit the workflow.

The input command pauses the execution of the workflow until the workflow operator user clicks the enter button, clicks a milestone or clicks a button on the toolbar. The input command therefore enables the workflow operator user to input information into the input window (then click the enter button), click a milestone in the milestone window or click a button on the toolbar.

The log command enables the WMS to record the date and time that each step in the workflow is completed. For each workflow, the workflow editor user can enable or disable logging.

The menu command enables the WMS to display a list of options that the user can select as input rather than inputting text into the input window. The workflow editor user can specify, in the menu command, the list of options from which the workflow operator user can select.

The milestone command is a bookmark in the project activity workflow. Each milestone has a corresponding hyperlink that is displayed in the milestone window. When the workflow operator user clicks a milestone hyperlink in the milestone window, the WMS will jump to the corresponding milestone command in the workflow.

The no action command is a placeholder in a workflow. It performs no function but enables the workflow editor user to convert it into a different command at a later time.

The open command enables the WMS to open a project activity form or open a specific project activity to be displayed in the project activity form. In the open command, the workflow editor user must specify the path to the target file to open. The open command also has an option to prompt the workflow operator user to search for the target file by browsing through the file system before the file is located and opened.

The pause command delays the workflow for a period of time. The actual delay time is specified by the workflow editor user as a parameter in the pause command.

The position command enables the WMS to re-position the cursor to a pre-determined field in the project activity form that is displayed in the output window 811. The workflow editor user specifies the pre-determined form field when the position command is configured.

The print command enables the WMS to print the project activity displayed in the project activity form. In the print command, the workflow editor user specifies the printer to use.

The repeat command enables the WMS to repeat a number of commands. The Repeat command marks the start of the list of commands to repeat.

The repeat end command marks the end of the commands that the WMS shall repeat.

The run command enables the WMS to run the executable file specified by the workflow editor user as a parameter in the run command. In the run command, the workflow editor user specifies the path to the file to run.

The save command enables the WMS to save a project activity.

The setup command enables the WMS to setup the user interface that will be seen by the workflow operator user (FIG. 8). It specifies a plurality of requirements, such as the number of windows to display and their location on the screen.

The start command enables the workflow operator user to start the workflow.

The variable command enables the WMS to define and use variables.

The video command enables the workflow to play a video file. In the video command, the workflow editor user specifies the path to the video file to play.

The write command enables the WMS to write information from a source location to a destination location. For each write command, the workflow editor user specifies the source and destination when that workflow editor user configures that write command in the workflow. For example, the workflow editor user may specify the source as the input window and the destination as a field in the project activity form in order for a write command to write the workflow operator user's input to the current field in the project activity form. Another write command may specify the source as all of the fields in the project activity form and the destination as the project activity database. This example write command will write the project activity, displayed in the project activity form, into the project activity database.

Figure 9:
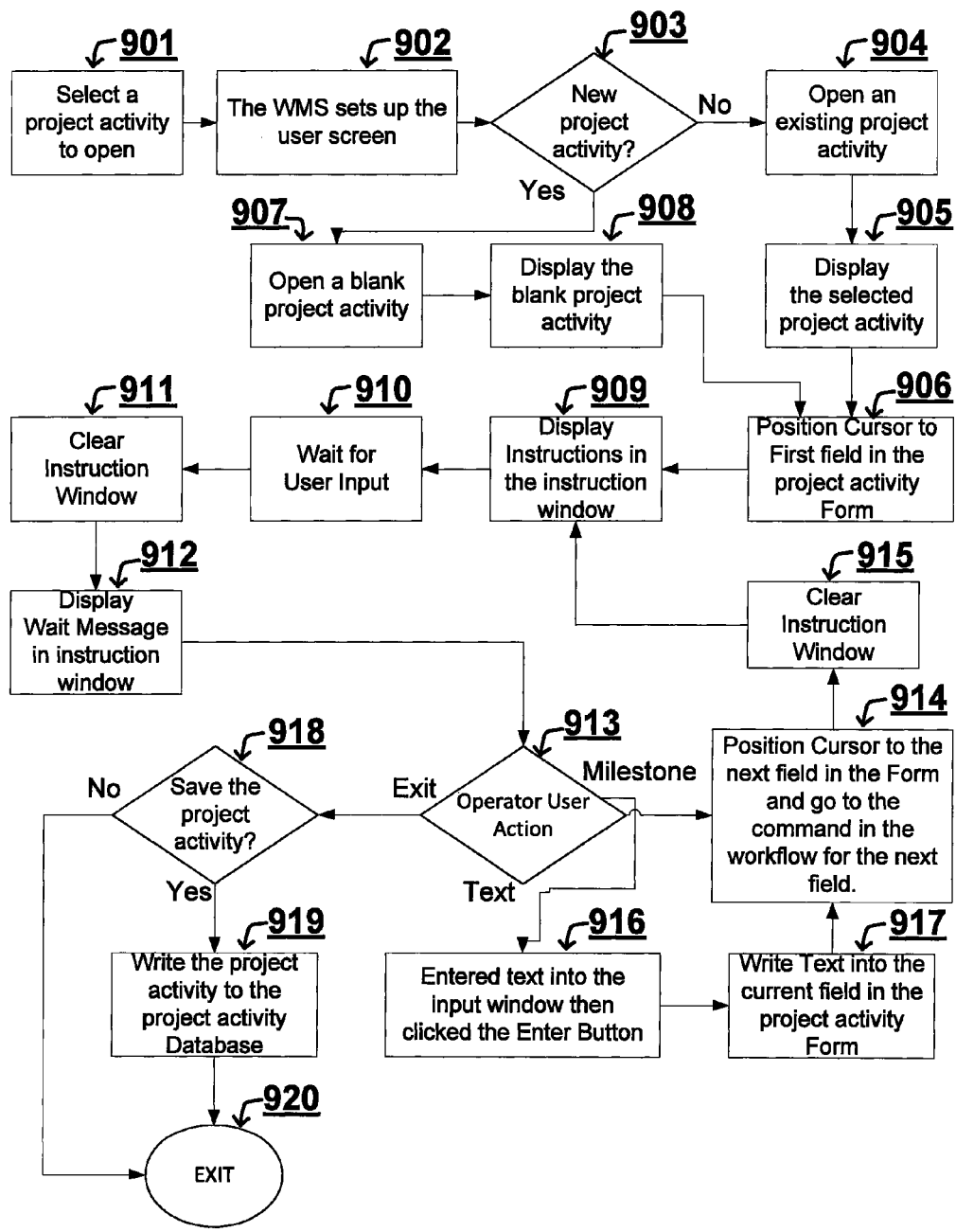
FIG. 9 illustrates a first embodiment of the workflow for the WMS of the present invention.

FIG. 9 illustrates the first embodiment of the project activity workflow that the workflow editor user configures in the Workflow Management System ("WMS"). This workflow is a computer program created using the commands available in the WMS. The workflow operator user logs into the WMS then selects the project activity workflow. The WMS launches the project activity workflow that is illustrated in FIG. 9.

The WMS executes an "open" command 901 that enables the WMS to open an existing project activity form. The WMS then executes the "setup" command 902 to configure the windows that comprise the user interface illustrated in FIG. 8.

After setting up the user interface, the WMS then executes a "branch" command 903. If the workflow operator user selected a project activity form populated with an existing project activity at step 901 then the WMS will execute an "open" command that enables the WMS to search for and locate the specified project activity 904. The "display" command will then display the specified project activity 905 in the project activity form displayed in the output window 811. The WMS will also execute a "position" command to position the cursor at the first field in the project activity form 906.

If the workflow operator user selected a new project activity at step 901 then, at step 903, the WMS will jump to step 907 where it will execute an "open" command that enables the workflow operator user to search for and locate a blank project activity. The "display" command will then display the blank project activity 908 in the project activity form displayed in the output window 811. Opening a blank project activity enables the workflow operator user to create a new project activity. Opening an existing project activity enables the workflow operator user to edit that existing project activity. The WMS will then execute a "position" command to position the cursor at the first field in the project activity form 906.

After positioning the cursor at the first field in the project activity form 906, the WMS will execute another "display" command 909 to display pre-determined instructions in the user instructions window. The workflow editor user inputs the pre-determined instructions into the display command when that workflow editor user creates the project activity workflow. The WMS then waits for an input from the workflow operator user 910. The workflow operator user has a number of input options including clicking the "exit" button on the toolbar 805, clicking a milestone hyperlink in the milestone window 812 and inputting text in the input window 809 then clicking the enter button 810. After the workflow operator user completes an input option, the WMS executes a "clear" command 911 to clear the instructions in the user instructions window 807. The WMS then executes a "display" command 912 to display the text "Wait . . . " in the user instructions window. When the project activity workflow was created, the workflow editor user configured the display command to display the "Wait . . . " text. The WMS then executes a "branch" command 913 that enables the WMS to jump to different commands in the workflow depending on the input option selected by the workflow operator user at step 910 in the workflow.

If the workflow operator user clicked a milestone hyperlink at step 910 in the workflow then the 913 branch command will direct the workflow to execute the "position" command at step 914 in the workflow. This "position" command will position the cursor at the field, in the project activity form, that is associated with the selected milestone. There is one milestone for each field that exists in the Project Activity form. The WMS will also jump to the step in the project activity workflow that corresponds with that field. The WMS then executes a "clear" command 915 that clears the information displayed in the user instructions window 807. This clear command is also configured to clear the information displayed in the input window 809. The workflow then returns to step 909 where the WMS displays pre-determined instructions in the user instructions window for the next field in sequence in the project activity then waits for the next input from the workflow operator user 910. Again, the workflow editor user inputs the pre-determined instructions into the display command when that workflow editor user created the project activity workflow. Each field in the project activity form has its own corresponding instructions. In addition, the workflow repeats this loop until the workflow operator user has entered information for each field in the project activity form.

If the workflow operator user chose to input text into the input window then clicked the enter button at step 910 in the workflow then the 913 branch command will direct the workflow to step 916 in the workflow. The WMS then executes the "write" command at step 917 in the workflow that writes the text, that the workflow operator user entered into the input window, to the currently positioned field in the project activity form. This enables the workflow operator user to input, into the input window, specific information about the project activity, which the WMS writes to the current field in the project activity form. The WMS then positions the cursor to the next field in the project activity form and the workflow points to the command in the workflow for the next field 914. The WMS then executes a "clear" command 915 that clears the information that the workflow operator user entered into the input window. This clear command is also configured to clear the information displayed in the user instructions window. The workflow then returns to step 909 where the WMS displays pre-determined instructions 909 in the user instructions window for the next field in sequence in the project activity form then waits for further input 910 from the workflow operator user.

If the workflow operator user had clicked the exit button at step 910 in the workflow then the 913 branch command will direct the workflow to step 918 in the workflow. The WMS will display a pop-up window with the message "Would you like to save the project activity displayed in the project activity form?". The pop-up window will have two options namely "yes" and "no". If the workflow operator user selects the "yes" option, the WMS executes the "write" command at step 919 in the workflow. This command writes the project activity displayed in the project activity form into the project activity database. The WMS then executes the "exit" command at step 920 and closes the workflow. If the workflow operator user selects the "no" option at step 918 in the workflow, the WMS executes the "exit" command at step 920 without saving the project activity then closes the workflow.

The WMS has a pointer for each form field. This pointer is incremented each time the WMS completes a loop in the project activity workflow. This enables the WMS to display the correct instructions for each form field in the instructions window. In addition, when the workflow operator user clicks a milestone, the workflow pointer is adjusted to the value of the form field that corresponds with the selected milestone. Again, this enables the WMS to display the correct instructions for each form field in the instructions window.

Figure 10:
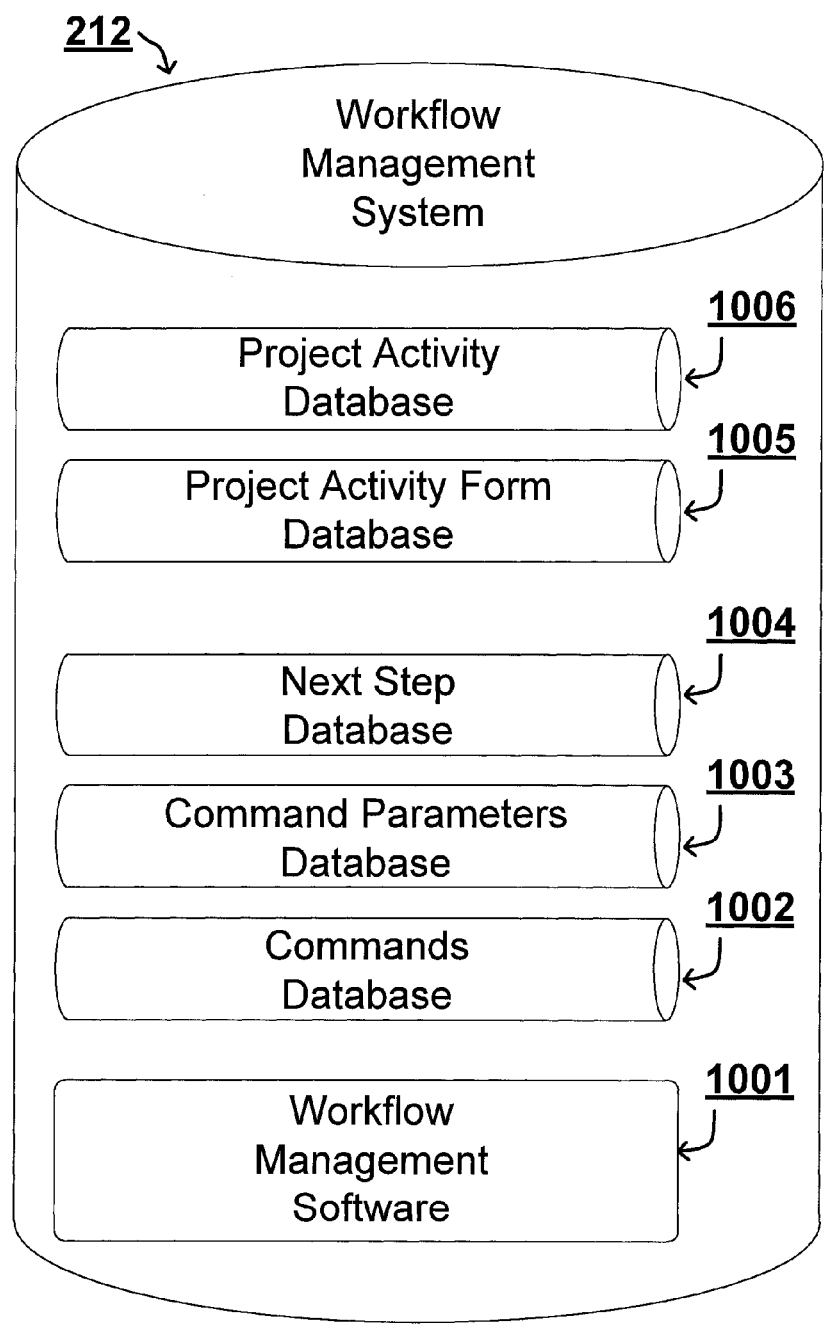
FIG. 10 illustrates a first embodiment of the key components of the WMS of the present invention.

FIG. 10 illustrates the architecture of the WMS. The WMS is comprised of a number of key components including the workflow management software 1001, the commands database 1002, the command parameters database 1003, the next step database 1004, the project activity form database 1005 and the project activity database 1006.

The WMS vendor develops and maintains the WMS software 1001. The software can be written in any one of a plurality of programming languages including java, javascript and visual basic. The WMS software implements a plurality of functionality including the functions offered by the buttons on the toolbars; the functionality offered by each of the WMS commands; the ability of the workflow editor user to create, edit and delete project activity workflows; the ability of the workflow editor user to create, edit and delete project activity forms; and the ability of the workflow operator user to execute the project activity workflow. Neither the programming language used to implement the WMS software nor the structure of the WMS software itself are limitations of the present invention. Rather, the limitations of the present invention are summarized by the functionality disclosed in this specification and the variations thereof that are evident to one skilled in the art. The present invention could therefore use another embodiment of the WMS software that could be developed by a third party so long as that embodiment of the WMS software also delivers substantially the same functionality disclosed in this specification. For the present invention, the applicant is also the developer of the WMS software.

The commands database 1002 stores information about the WMS commands. This database includes a plurality of fields including a unique reference key for each record in the commands database and the name of the command represented by that record in the database. For example, there will be one record in the commands database for the display command, one record for the input command, and one record for each of the other commands.

The WMS stores, in the command parameters database 1003, parameters associated with each command in the workflow. The commands parameters database has one record for each command in the workflow. For example, one "display" command in the workflow may include the following text parameter "Wait ...". Similarly, another "display" command in the workflow may include the following text parameter "Input a summary of your project activity". This command parameters database includes a plurality of fields including a unique reference key for each record in the command parameters database, the unique reference key for the command and a parameters field.

The WMS stores sequencing information in the next step database 1004. Each step in the workflow is a command and has a unique sequence number. In the next step database, the WMS links the sequence number of each command with the sequence number of the next command in the workflow. For a "branch" command, the next step database has one entry for each branch. For example, if a "branch" command has two options (for example "yes" and "no"), that branch command will have two potential next steps and therefore two next step entries in the next step database. If the workflow editor user configures a branch command with five options then that branch command will have five next step entries in the next step database. The next step database includes a plurality of fields including a unique reference key for each record in the next step database, the sequence number of the current step and the sequence number of the next step.

The WMS stores project activity forms in the project activity form database 1005. After the workflow editor user creates a project activity form, the WMS stores that project activity form in the project activity form database. The workflow editor user can create more than one project activity form and store multiple project activity forms in the project activity form database. The project activity form database includes a plurality of fields including a unique reference key for each record in the project activity form database, the name of the project activity form, the height of the form, the width of the form, whether the form has a title, the name of a form field (there is one record in the project activity form database for each form field), the distance of the form field from the left margin of the project activity form, the distance of the form field from the top margin of the project activity form, the height of the form field, the width of the form field, the default value for the form field, the tab index of the form field, the font name for the text in the form field, the font size for the text in the form field and the font color for the text in the form field. These form fields are described in more detail in FIG. 12.

The WMS stores project activities in the project activity database 1006. After the workflow operator user creates a project activity, the WMS stores that project activity in the project activity database. When the workflow operator user searches for a project activity, the WMS will search for that project activity in the project activity database. This database contains the same information that is in the project activity database 503 in the data storage system 203. In a second embodiment of the present invention, these two databases are one and the same.

Figure 11:
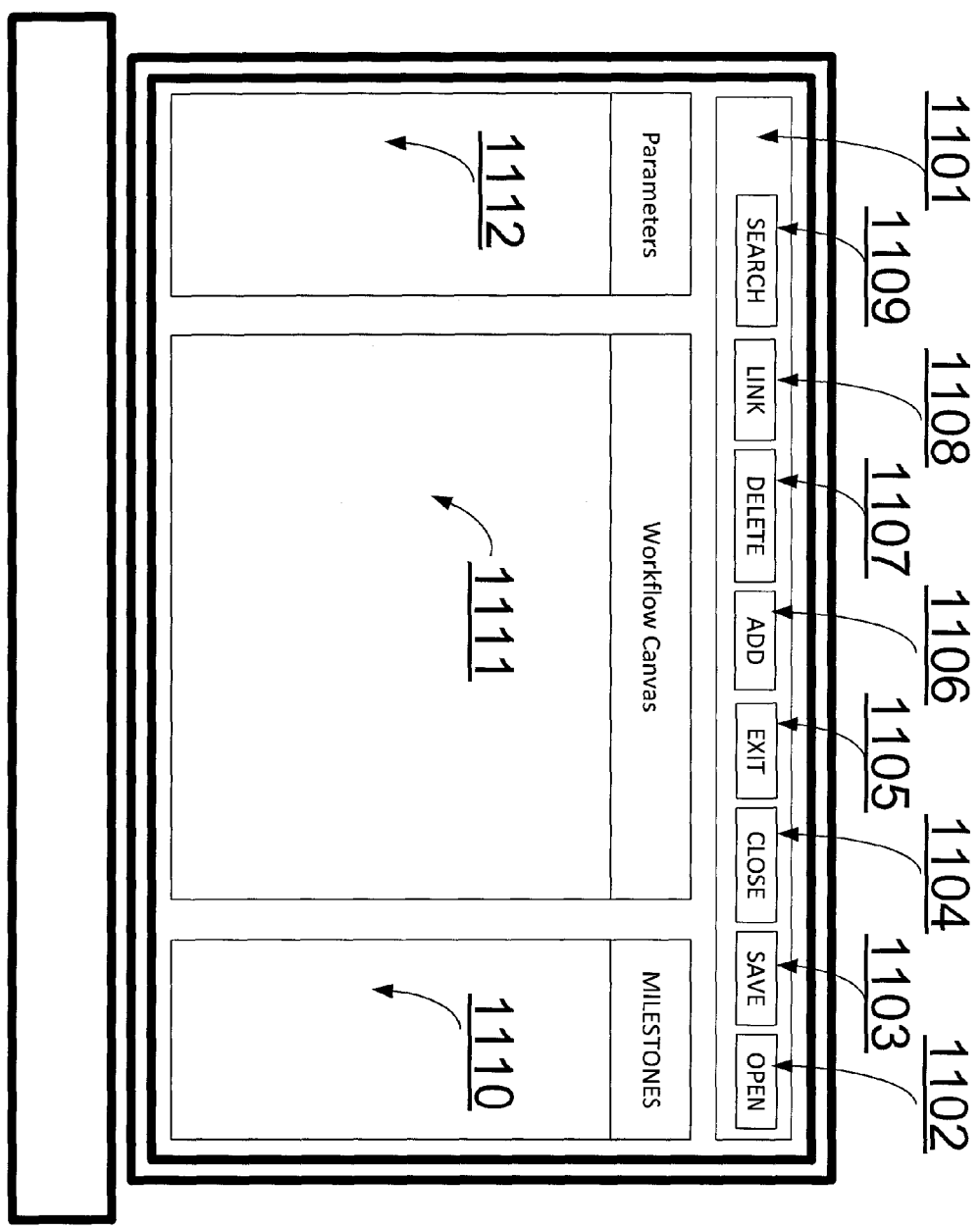
FIG. 11 illustrates a first embodiment of the workflow editing interface for the WMS of the present invention.

FIG. 11 illustrates the user interface seen by the workflow editor user when creating and editing the project activity workflow in the WMS. The key components of this workflow editor interface include the editor toolbar 1101, the milestones window 1110, the workflow canvas window 1111 and the command parameters window 1112.

The editor toolbar includes a number of buttons including the open button 1102, the save button 1103, the close button 1104, the exit button 1105, the add button 1106, the delete button 1107, the link button 1108, and the search button 1109. The open button enables the workflow editor user to open a project activity workflow. The save button enables the workflow editor user to save a project activity workflow. The close button enables the workflow editor user to close a project activity workflow. The exit button enables the workflow editor user to exit the WMS. The add button enables the workflow editor user to add a command to the workflow. The delete button enables the workflow editor user to delete a command from the workflow. The link button enables the workflow editor user to link two commands in a workflow. The search button enables the workflow editor user to search for and locate a project activity workflow to edit.

The purpose of the milestones window 1110 is to display the list of fields that are in the project activity form. Again, the project activity workflow has one milestone for each field in the project activity form. When the workflow editor user clicks a milestone listed in the milestones window, such as the "summary" milestone, the WMS will reposition the project activity workflow, displayed in the workflow canvas window, to that milestone command.

The purpose of the workflow canvas window 1111 is to display the project activity workflow as a sequence of interconnected icons. Each icon represents a step in the workflow and each step is a command in the workflow. For example, the WMS will display, on the workflow canvas, an "input" icon for each "input" command in the workflow. The WMS will also display, on the workflow canvas, an icon for each other type of command that the workflow editor user has configured in the workflow. The WMS will also display the links between connected commands.

The purpose of the parameters window 1112 is to enable the workflow editor user to edit the parameters associated with the workflow step that is currently selected in the workflow canvas window. The workflow editor user can select a command in the workflow that is displayed in the workflow canvas window. The WMS system will then display the parameters for that command in the parameters window. Then the workflow editor user can edit the parameters for that command in the parameters window. The workflow editor user can then store the new parameters in the command parameters database 1003 by saving the parameters. For example, the workflow editor can select a display command on the workflow canvas then input the text that the command should display and specify the window where the text should be displayed, such as the input window 809.

In the first embodiment of the present invention, the WMS enables the workflow editor user to create a project activity workflow by opening a blank workflow or by opening an existing project activity workflow. The workflow editor user can add, edit and delete commands in the workflow that the WMS is currently displaying on the workflow canvas. The WMS also enables the workflow editor user to inter-connect the commands on the workflow canvas. In addition, the WMS enables the workflow editor user to select a command on the workflow canvas then edit the parameters associated with that command in the command parameters window. The WMS then allows the workflow editor user to save the changes that have been made to the command parameters and to the project activity workflow.

When the workflow editor user adds a command to the workflow, the WMS adds an entry into the command parameters database 1003. When the workflow editor user deletes a command from the workflow, the WMS deletes the entry for that command from the command parameters database. When the workflow editor user edits the parameters displayed in the parameters window for a command, the WMS edits the parameters field for that command's entry in the command parameters database.

When the workflow editor user creates a link between two commands in a workflow, the WMS adds an entry into the next step database 1004. This entry in the next step database specifies that the second command on a link follows the first command on the same link. When the workflow editor user deletes a link between two commands, the WMS deletes the entry for that link in the next step database. When the workflow editor user deletes a command in a workflow, the WMS also deletes the entries in the next step database associated with that deleted command.

Figure 12:
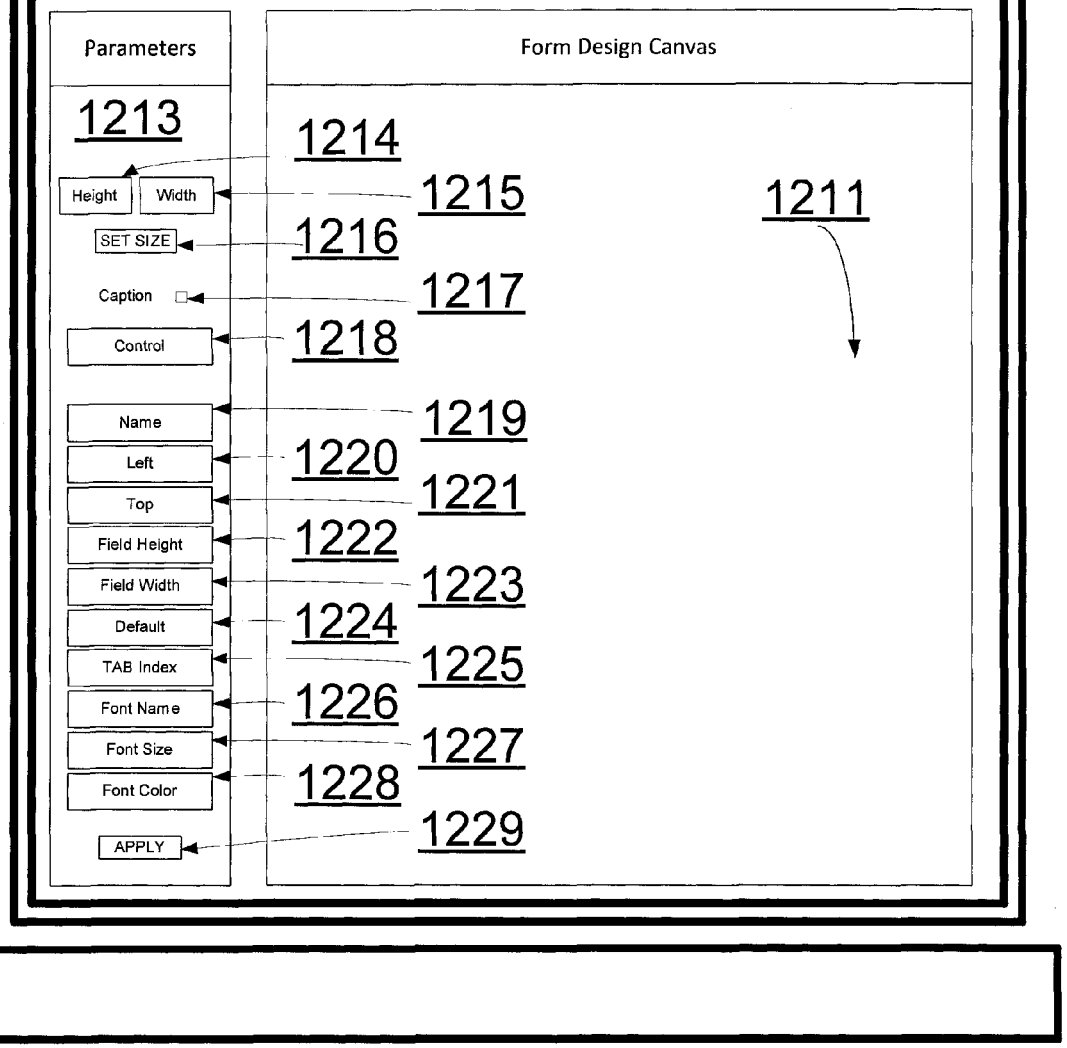
FIG. 12 illustrates a first embodiment of the form editor interface for the WMS of the present invention.

FIG. 12 illustrates the user interface seen by the workflow editor user when creating and editing the project activity form in the WMS. The key components of this form editor interface include the editor toolbar 1201, the parameters window 1213 and the form design canvas 1211.

The editor toolbar includes a number of buttons including the open button 1202, the close button 1203, the new button 1204, the save button 1205, the save as button 1206, the reload button 1207, the import button 1208, the delete button 1209, and the exit button 1210. The open button enables the workflow editor user to open a project activity form. The close button enables the workflow editor user to close a project activity form. The new button enables the workflow editor user to create a new project activity form. The save button enables the workflow editor user to save a project activity form with the same name. The save as button enables the workflow editor user to save a project activity form with a different name. The reload button enables the workflow editor user to reload data from the database into the project activity form. The import button enables the workflow editor user to link a database to the project activity form and import data from that database into the form. The delete button enables the workflow editor user to delete a project activity form from the project activity database. The exit button enables the workflow editor user to exit the WMS.

The purpose of the form design canvas 1211 is to display the form fields that comprise the project activity form. The project activity form will be displayed in the output window 811 when the workflow operator user is executing the project activity workflow. Each form field requires data to be input by the workflow operator user or requires automatic input from the WMS. An example of a form field that requires automatic input from the WMS is a timestamp. When the workflow operator user enters a project activity into the project activity form, the WMS will automatically input the date and time into the timestamp field. This timestamp records the date and time that the workflow operator user entered that project activity.

The workflow editor user can add a default text box field to the project activity form by left clicking (e.g., clicking the left button on the mouse) a location in the form design canvas. The workflow editor user can then right click (e.g., click the right button on the mouse) and the WMS will display a list of options including the option to add a default text box at the selected location on the project activity form. The workflow editor user can then change the default text box into the required form field by editing the parameters for the newly added form field in the parameters window. The workflow editor user can delete a form field by right clicking that form field. The WMS will display a number of options including delete. The workflow editor user can select the delete option to delete the selected form field from the project activity form displayed on the form design canvas.

The purpose of the parameters window 1213 is to enable the workflow editor user to edit the parameters associated with the form field that is selected in the form design canvas. The workflow editor user can select a form field that is displayed in the form design canvas by left clicking that form field. The WMS will then display the parameters for that form field in the parameters window. Then the workflow editor user can edit the parameters for that form field in the parameters window. The workflow editor user can then store the new parameters for that form field in the project activity form database 1005 by clicking the apply button 1229. The following section describes the parameters that are available in the parameters window.

The height parameter 1214 enables the workflow editor user to input the required height for the project activity form. The width parameter 1215 enables the workflow editor user to input the required width for the project activity form. The set size button 1216 enables the workflow editor user to save the new size for the project activity form. The caption check box 1217 enables the workflow editor user to specify whether the project activity form will have a title. If the workflow editor user selects the caption check box, the WMS will display a default title on the form design canvas. The WMS allows the workflow editor user to select the title and change the title and its location by changing its parameters in the parameters window. The control parameter 1218 enables the workflow editor user to specify the type of form field that will be displayed in the project activity form. The WMS supports a plurality of field types including a text box, list box, check box, radio button and memo field. This list is exemplary and not intended to be limiting. One skilled in the art will understand the purpose and use of these types of form fields. The name parameter 1219 enables the workflow editor user to input a name for the selected field in the project activity form. The left parameter 1220 enables the workflow editor user to specify the location of the selected form field in terms of its distance from the left edge of the project activity form. The top parameter 1221 enables the workflow editor user to specify the location of the selected form field in terms of its distance from the top edge of the project activity form. The field height parameter 1222 enables the workflow editor user to input the required height of the selected form field. The field width parameter 1223 enables the workflow editor user to input the required width of the selected form field. The default parameter 1224 enables the workflow editor user to input the required default value for the selected form field. The tab index parameter 1225 enables the workflow editor user to input the required tab index to be used for the selected form field. When the workflow operator user is entering data into the project activity form, the workflow operator user can click the tab key on the keyboard to move from one field in the project activity form to the next. The tab order is determined by the numeric value entered into the tab index parameter for each form field. The font name parameter 1226 enables the workflow editor user to input the required text font to be used for the selected form field. The font size parameter 1227 enables the workflow editor user to input the required text size to be used for the selected form field. The font color parameter 1228 enables the workflow editor user to input the required text color to be used for the selected form field. The apply button 1229 enables the workflow editor user to save the new parameters for the selected form field into the project activity form database.

In the first embodiment of the present invention, the WMS enables the workflow editor user to create a project activity form by opening a blank form or edit a form by opening an existing project activity form. The workflow editor user can add, edit and delete project activity forms. The workflow editor user can also add, edit and delete form fields within each project activity form. The WMS enables the workflow editor user to open a project activity form that the WMS will display on the form design canvas. The WMS then enables the workflow editor user to select a form field in the project activity form displayed on the form design canvas then edit the parameters for that selected form field. The workflow editor user can then click the apply button in the parameters window to save the updated parameters and the associated project activity form into the project activity form database. The workflow editor user can add an open command into the project activity workflow that will open the project activity form and a display command that will display the project activity form in the output window. The workflow operator user can then enter a project activity by executing the project activity workflow and following the sequence of instructions or by entering the information directly into the project activity form displayed in the output window.

The Central Control System, User Interfaces, Data Storage System, Business Intelligence System and Workflow Management System are illustrated in FIG. 1 to FIG. 12. These systems are the key components that enable the present invention. The following sections explain how these systems in combination enable the unique features of the present invention.

The default project activity form and default project activity workflow used by the present invention were created as a collaborative effort by a number of experts in the field. These forms and workflows therefore represent an aggregation of the project activity knowledge of these experts. The WMS therefore enables the workflow operator user to leverage the knowledge of these experts by accessing the project activity form and using the project activity workflow as a guide to fill in the fields in the project activity form in accordance with the project organization's preferred method. Each project organization can use the WMS to modify the default project activity form and the default project activity workflow then input their own version of each that is a better match to the unique requirements of their project organization. For example, a given project organization may delete a specific field in the default project activity form if they will not use that field.

The present invention has a plurality of variations including entering the project activities and their meta data via a form without the help of a project activity workflow and entering project activities into a database table that lists a number of project activities with and without the help of a project activity workflow or a project activity form. In addition, some database applications, such as Microsoft Access, include a reporting capability and a querying capability that enable a variation of the present invention that does not require a separate business intelligence system.

The first embodiment of the present invention includes the following steps to measure, report and manage the number and importance of planned and unplanned project activities in near real time.

a) At least one member of the project team can input a summary of each project activity directly into the summary field 1301 in the project activity form FIG. 13 or input the summary by using the project activity workflow as a guide as described above.

b) At least one member of the project team can input meta data for each project activity including whether each project activity is planned or unplanned 1309. The project team member can input this meta data into the project activity form at the same time that the project activity is entered or soon thereafter.

c) At least one member of the project team can input additional meta data for each project activity including indicating the level of importance 1312 of each project activity, such as high, medium or low. The project team member can input this meta data into the project activity form at the same time that the project activity is entered or soon thereafter.

d) The BIS is the means to count the number of planned project activities that have been assigned each level of importance, such as high, medium and low. For example, there may be 100 planned project activities that the project team considers to be of high importance, 120 that are medium importance and 125 that are low importance.

e) The BIS is the means to count the number of unplanned project activities that have been assigned each level of importance, such as high, medium and low. For example, there may be 50 unplanned project activities that the project team considers to be of high importance, 30 that are medium importance and 25 that are low importance.

f) The BIS is the means to configure and display the reports that represent the number and importance of planned and unplanned project activities. So long as the meta data is entered within 24 hours to one week of the time that the project activity is entered then the project team can use the present invention to measure, report and manage the number and importance of planned and unplanned project activities in near real time (defined as within 24 hours to 1 week for the present invention).

The first embodiment of the present invention includes the following steps to measure, report and mitigate the completion of planned and unplanned project activities in near real time (defined as within 24 hours to 1 week for the present invention)

a) At least one member of the project team can input a summary 1301 of each project activity into the project activity form FIG. 13 and indicate whether each project activity is planned or unplanned 1309.

b) At least one member of the project team can input meta data for each project activity including the mitigation status 1308 of each project activity. The project team member can input this meta data into the project activity form at the same time that the project activity is entered or soon thereafter. The project team member can enter into the project activity form one of a number of mitigation status options for each project activity including open, transferred to a project team member, avoided by changing the sequence of steps in the plan and closed. This list of mitigation status options is not intended to be exhaustive or limiting. Other examples will be apparent to one skilled in the art.

c) The BIS is the means to measure and report the completion status of planned and unplanned project activities. So long as the meta data is entered within 24 hours to one week of the time that the mitigation status is updated then the project team can use the present invention to measure, report and mitigate the completion of planned and unplanned project activities in near real time (defined as within 24 hours to 1 week for the present invention).

The first embodiment of the present invention includes the following steps to measure, report and manage, in near real time, whether the number of planned and unplanned project activities is increasing or decreasing.

a) At least one member of the project team can input a summary 1301 of each project activity into the project activity form FIG. 13 and indicate whether each project activity is planned or unplanned.

b) The BIS is the means to count the number of planned and unplanned project activities and is also the means to configure and display reports.

c) As project team members input new planned project activities the number of planned project activities will increase. As project team members input new unplanned project activities the number of unplanned project activities will increase.

d) As project team members close existing planned project activities that have been completed the number of planned project activities will decrease. As project team members close existing unplanned project activities that have been closed the number of unplanned project activities will decrease.

e) The BIS is the means to extract the number of planned and unplanned project activities from the Project Activity Database 1006 then measure and report whether the number of planned and unplanned project activities is increasing or decreasing over time.

The first embodiment of the present invention includes the following steps to measure, report and manage, in near real time, unscheduled project activities.

a) At least one member of the project team can input a summary 1301 of each project activity into the project activity form FIG. 13 and indicate whether each project activity is scheduled or unscheduled 1310. An unscheduled project activity may be planned or unplanned but does not have a scheduled date and time for implementation or was implemented at the wrong time.

b) The BIS is the means to extract the number of planned and unplanned project activities from the Project Activity Database 1006 then measure and report the scheduled and unscheduled status of project activities. So long as the meta data is entered within 24 hours to one week of the time that the status is updated then the project team can use the present invention to measure, report and manage unscheduled project activities in near real time (defined as within 24 hours to 1 week for the present invention).

The first embodiment of the present invention includes the following steps to measure, report and manage, in near real time, activities associated with unauthorized project activities.

a) At least one member of the project team can input a summary 1301 of each project activity into the project activity form FIG. 13 and indicate whether each project activity is authorized or unauthorized 1311. An unauthorized project activity may be planned or unplanned and may be scheduled or unscheduled but it is implemented at the wrong time without the permission of the project leadership.

b) The BIS is the means to extract the number of authorized or unauthorized project activities from the Project Activity Database 1006 then measure and report the authorized or unauthorized status of project activities. So long as the meta data is entered within 24 hours to one week of the time that the status is updated then the project team can use the present invention to measure, report and manage unauthorized project activities in near real time (defined as within 24 hours to 1 week for the present invention).

The first embodiment of the present invention includes the following steps to enable organizational management to use project control information and reports to determine which project enablers are driving project stages out of control and which project enablers are contributing to bringing project stages under control.

a) The vendor of the present invention creates at least one project enabler workflow comprised of a sequence of questions and answer options that is designed to capture information about the performance of each stage of a project. The WMS is the means to create each project enabler workflow FIG. 11.

b) In the first embodiment of the present invention, the vendor of the present invention will create at least one workflow for each project performance measure. The project performance measures will include but will not be limited to scope, cost, schedule and quality.

c) By way of example, the schedule project performance measure workflow is comprised of a number of questions including questions that ask whether the project stage was completed on time, whether the person answering the question completed all of their tasks on schedule, how the schedule performance of the person answering the question impacted overall schedule performance for that project stage, what were the key reasons for the good or poor schedule performance, what activities could have been improved to improve schedule performance, what was most effective about schedule performance, what was least effective about schedule performance, and what grade from 1 (worst) to 10 (best) is a fair measure of schedule performance for that specified project stage and stage index. This list of schedule questions is not intended to be exhaustive or limiting. Other examples will be apparent to one skilled in the art.

d) The cost project performance measure workflow is also comprised of a number of questions that are similar to those in the schedule project performance measure workflow including questions that ask whether the project stage was completed within the budget allocated by the project organization, whether the person answering the question completed all their tasks within the allocated budget, how the budget performance of the person answering the question impacted overall budget performance for that project stage, what were the key reasons for the good or poor budget performance, what activities could have been improved to improve budget performance, what was most effective about budget performance, what was least effective about budget performance, and what grade from 1 (worst) to 10 (best) is a fair measure of budget performance for that specified project stage and stage index. This list of budget questions is not intended to be exhaustive or limiting. Other examples will be apparent to one skilled in the art.

e) The scope project performance measure workflow is also comprised of a number of questions that are similar to those in the schedule project performance measure workflow including questions that ask whether the full scope of features were delivered on time and within the allocated budget, whether the person answering the question completed all scope functionality for their tasks on schedule, how the scope performance of the person answering the question impacted overall scope performance for that project stage, what were the key reasons for the good or poor scope performance, what activities could have been changed to improve scope performance, what was most effective about scope performance, what was least effective about scope performance, and what grade from 1 (worst) to 10 (best) is a fair measure of scope performance for that specified project stage and stage index. This list of scope questions is not intended to be exhaustive or limiting. Other examples will be apparent to one skilled in the art.

f) The quality project performance measure workflow is also comprised of a number of questions that are similar to those in the schedule project performance measure workflow including questions that ask whether the project deliverables had the level of quality expected by the project organization, whether the person answering the question completed all of their tasks with the expected level of quality, how the quality of work of the person answering the question impacted overall quality performance for that project stage, what were the key reasons for the good or poor quality performance, what activities could have been changed to improve quality performance, what was most effective about quality performance, what was least effective about quality performance, and what grade from 1 (worst) to 10 (best) is a fair measure of quality performance for that specified project stage and stage index. This list of quality questions is not intended to be exhaustive or limiting. Other examples will be apparent to one skilled in the art.

g) In the first embodiment of the present invention, the vendor of the present invention will also create at least one causal project enabler workflow for each project enabler that can impact project control. The list of causal project enabler workflows include at least one for each of the following project enablers; business case, business management, project communications, project customers, project leadership, project processes, project management, project requirements, project risks, resource roles, project suppliers, project support and resources, project teamwork, project technology, project value and project timing. This list of project enablers is not intended to be exhaustive or limiting. Other examples will be apparent to one skilled in the art.

h) The developer of the present invention has researched the literature to identify the key success factors of each of the included project enablers. The culmination of this research is a set of questions and answer options designed to determine the effectiveness of each project enabler for each project stage and stage index. This set of questions and answer options comprise the causal project enabler workflow for each project enabler.

i) Moreover, the included project enablers are the key success factors that determine whether a project will succeed or fail. Again, the developer of the present invention has researched the literature to identify the key success factors for projects to determine this list of project enablers. The purpose of the causal project enabler workflow for each project enabler is to determine whether that project enabler is contributing to the success of the project or whether it is a potential cause of failure. In general, if the project enabler has a high average grade from the causal project enabler workflow then it is contributing to the success of the project. Conversely, if the project enabler has a low average grade then it is contributing to the failure of the project.

j) For example, effective leadership is a key project enabler for project success. The literature indicates that key success factors for effective leadership include developing a clear vision for the goals of the project, developing a strategy to achieve the vision, communicating the vision and strategy to project stakeholders then motivating the project team members to complete their assigned project activities. The questions in the leadership causal project enabler workflow are designed to determine the effectiveness of the key success factors of project leadership. For example, the leadership causal project enabler workflow includes questions that ask did this stage of the project have a clear vision, what were the key reasons for the vision being clear or unclear, what activities could have clarified the vision or could have improved its effectiveness, was the project's strategy effective, what specific activities made the strategy effective or ineffective, was the project's vision and strategy communicated effectively, what specific actions made the communication effective or ineffective, were the members of the project team motivated effectively, what specific actions made the motivation effective or ineffective, what was most effective about project leadership, what was least effective about project leadership, what specific actions could have been implemented differently to improve leadership, and what grade from 1 (worst) to 10 (best) is a fair measure of project leadership for the project stage and stage index specified by the project team member who is answering the questions. This list of leadership questions is not intended to be exhaustive or limiting. Other examples will be apparent to one skilled in the art.

k) The developer of the present invention has developed similar causal project enabler workflows for each of the other project enablers. The developer of the present invention has conducted research to identify the key success factors for each project enabler then developed a set of questions and answer options whose goal is to determine whether each project enabler is contributing to the project's success or contributing to its failure. Rather than trying to include all of the questions and answer options for all causal project enabler workflows in this disclosure it will be obvious to one skilled in the art that the concept detailed in the example disclosed above for leadership can be applied to all of the other project enablers.

l) Each member of the project team answers the questions posed in each causal project enabler workflow. The WMS FIG. 8 instructs the user to input specific meta data when executing each causal project enabler workflow, such as the name of the project, the project's stage and the stage index. The stage index enables the WMS to distinguish between answers for a given causal project enabler workflow when that workflow is executed multiple times within the same stage of a given project. For example, the first time that the schedule causal project enabler workflow is executed by a specific project team member for the initiation stage of a particular project, the stage index will be "1". If the schedule causal project enabler workflow is repeated a second time by the same project team member for the initiation stage of the same project then the stage index will be "2". The project organization determines when each causal project enabler workflow will be executed for any given project. For example, the project organization may decide to execute all causal project enabler workflows once at the end of each project, once at the end of each project stage, multiple times within each project stage, whenever a project is deemed to be in trouble or any other frequency selected by the project organization.

m) The WMS captures the answers to the questions for each causal project enabler workflow 809 and stores the answers in the WMS database 505. The WMS stores additional meta data with each answer including the question, the project team member executing the project enabler workflow, the time the answer was submitted, the name of the project, the project's stage and the stage index. Again, this list of meta data is not intended to be exhaustive or limiting. Other examples will be apparent to one skilled in the art. For example, other meta data, such as the project's name, is captured by including a question in a project enabler workflow that asks for this meta data. The project organization can edit each default causal project enabler workflow and each default project performance measure workflow to better meet their unique business needs.

n) If the average grade for a project enabler, for a given project, is low or declining and the average grade for a project performance measure (e.g., schedule, cost, scope, quality) is also low or declining and the BIS has identified a causal relationship between the two then that project enabler is contributing to drive that project stage out of control. Conversely, if the average grade for a project enabler is high or increasing and the average grade of a project performance measure is also high or increasing and the BIS has identified a causal relationship between the two then that "causal" project enabler is contributing to bringing that project stage under control. Again, a business intelligence system (BIS) is designed to identify trends, patterns and relationships in large databases, such as causal relationships between project enablers and performance measures, using various techniques such as regression analyses.

o) The first embodiment of an average grades report is illustrated in FIG. 15. For each project, project stage or stage index the BIS can extract average grade scores 1501 for project enablers from the WMS database then display the average grade for each project performance measure 1502 and each project enabler 1503 in the average grades 1815 report.

p) The WMS and the BIS are the means to enable organizational management to use project control information and reports to determine which project enablers are driving project stages out of control and which project enablers are contributing to bringing project stages under control.

Figure 16:
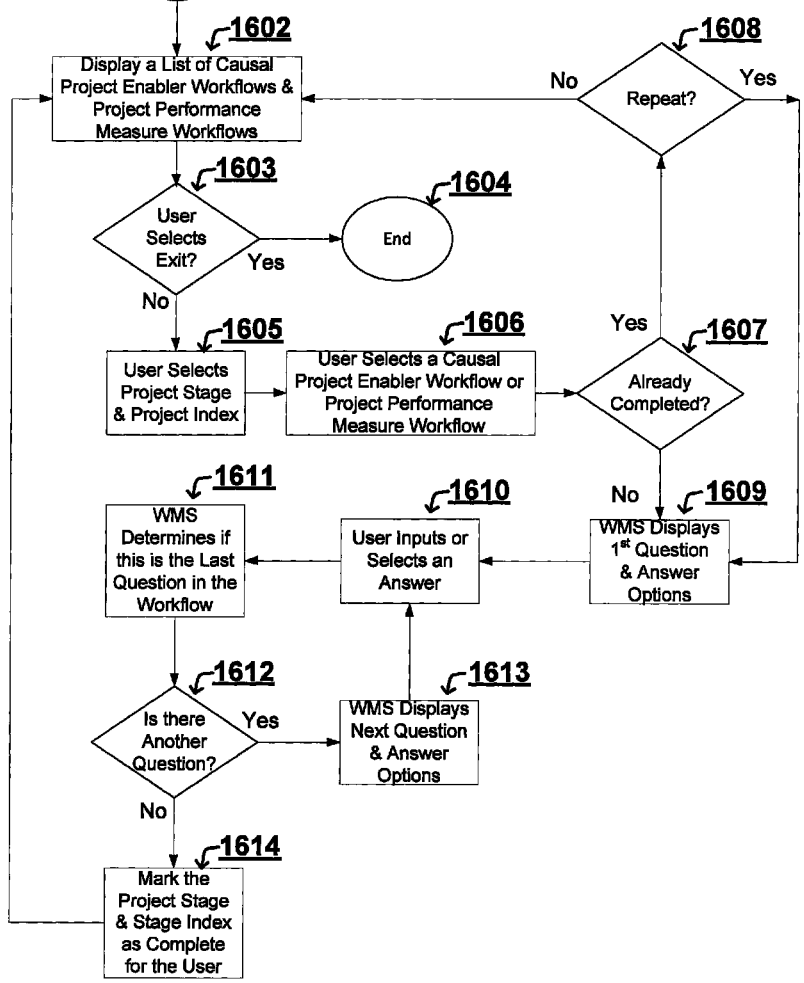
FIG. 16 illustrates a first embodiment of the project enabler workflow that captures information about project performance measures and project enablers.

The first embodiment of the present invention includes the following steps to capture lessons learned information directly from project team members and better understand the cause and effects of control trends then diagnose and link said causes and effects then recommend a corrective plan. Enablers are the causes and project performance measures, such as over budget and late completion, are the effects.

a) Each member of the project team answers the questions posed in each causal project enabler workflow (e.g., otherwise known as a lessons learned decision tree) when a lessons learned process is requested by the project organization. The lessons learned information (e.g., answers to questions in a causal project enabler workflow) is therefore captured directly from project team members. The WMS is the means to capture lessons learned information directly from project team members.

b) FIG. 16 illustrates an overview of the lessons learned decision tree. The lessons learned process starts 1601 when a member of the project team (e.g., user) accesses the list of project performance measure workflows and causal project enabler workflows 1602. The user has the option to exit 1603 and end the lessons learned process 1604. Alternatively, the user can select a project stage and stage index 1605 then select a project performance measure workflow or select a causal project enabler workflow 1606. The present invention then checks if that user has already completed the selected project performance measure workflow or the selected causal project enabler workflow for the specified project stage and project index. If the selected project performance measure workflow or the selected causal project enabler workflow has already been completed 1607 for the specified project stage and project index then the system asks the user if they want to repeat 1608 the selected workflow. If the user chooses not to repeat the selected workflow for the select project stage and stage index then the lessons learned process returns to step 1602. If the user chooses to repeat the selected workflow for the selected project stage and stage index or the workflow has not already been completed 1607 then the lessons learned process goes to step 1609. At step 1609 the selected workflow displays the first question and also displays any corresponding answer options that were configured when the workflow was created. The user then inputs a response or selects an answer option 1610. The present invention then determines if the question just displayed is the last question in the workflow 1611. If there is another question in the workflow then the lessons learned process moves to step 1613. At step 1613 in the lessons learned process, the present invention displays the next question and its corresponding answer options. The lessons learned process then returns to step 1610. At step 1612, if the question just displayed is the last question in the workflow then the lessons learned process moves to step 1614 where the present invention marks the workflow complete for the selected project stage and stage index for that specific user. The lessons learned process then returns to the step 1602 where the user can choose to exit or execute another causal project enabler workflow or execute another project performance measure workflow. The WMS is the means to create and execute the high level lessons learned process illustrated in FIG. 16. Each high level step in FIG. 16 is comprised of at least one WMS command. For example, the WMS commands that comprise step 1602 include a menu command and a display command. The WMS commands are described above. The WMS is also the means to create and execute the individual project performance measure workflows and the individual causal project enabler workflows that a user can launch at step 1602 in the lessons learned process illustrated in FIG. 16.

c) The performance of project enablers is the cause of project control trends and the project performance measures are the effect of project control. For example, poor project communication (e.g., the cause) can lead to poor project control and, in turn, to poor project schedule performance (e.g., the effect). Project team members can input meta data into the project activity form FIG. 13 that indicates the main causal project enabler 1313 and the main effect project enabler (e.g., project performance measure) 1314 for each project activity.

d) The BIS is the means to identify trends, patterns and relationships in the data captured by the lessons learned process. Such relationships include relationships between project enablers (e.g., causes) and project performance measures (e.g., effects). Business Intelligence systems use many techniques to analyze data in order to relate causes and effects such as regression analyses. U.S. Pub. No. US20070288199 teaches an example technique that can be used to relate an objective variable (e.g., the effect) to multivariate data (e.g., possible causes) as required by the present invention. In addition, U.S. Pub. No. US20080243912 teaches that in the context of business intelligence systems neural networks, neuro-fuzzy systems, fuzzy systems, regression trees, and linear regression are appropriate relationship models for numeric relationships. Relating average grades for project performance measures to average grades for causal project enablers is an example of such a numeric relationship. The relationship models listed above are therefore appropriate relationship techniques that can be used by the business intelligence system of the present invention to identify relationships between project performance measures and causal project enablers. This list is not intended to be exhaustive or limiting and other appropriate relationship models will be apparent to one skilled in the art.

e) Using a linear regression analysis to identify relationships between project performance measures and causal project enablers will result in an equation that has a format similar to the following:

$$y = a1 \times b1 + a2 \times b2 + a3 \times b3 + a4 \times b4 \ldots$$

Where "y" is the average grade for a first project performance measure (schedule say), $a1$ is a multiplication factor for the first causal project enabler (say communication), $b1$ is the average grade for the first causal project enabler (e.g., communication), $a2$ is a multiplication factor for the second causal project enabler (say leadership), $b2$ is the average grade for the second causal project enabler (e.g., leadership), etc. This equation will include a multiplication factor and corresponding average grade for each causal project enabler. The business intelligence system will extract the average grades y, $b1$, $b2$, $b3$, etc. from the data warehouse. The relationship technique, such as a regression analysis will calculate the multiplication factors $a1$, $a2$, $a3$, etc. For example, if the relationship technique indicates that 100% of the average grade for the schedule project performance measure is determined by communications and $b1$ is the average grade for communications then $a1$ is 100% and all other multiplication factors ($a2$, $a3$, etc.) are all equal to 0%. Similarly, if the relationship technique indicates that 75% of the average grade for the schedule project performance measure is determined by communications and $b1$ is the average grade for the communications causal project enabler and 25% of the average grade for the schedule project performance measure is determined by leadership and $b2$ is the average grade for the leadership causal project enabler then $a1$ is 75%, $a2$ is 25% and all other multiplication factors ($a3$, $a4$, etc.) are all equal to 0%. In this case, if the average grade for the communications causal project enabler is 8 and the average grade for the leadership causal project enabler is 4 then the average grade for the schedule project performance measure is $y = 0.25 \times b1 + 0.75 \times b2 = 0.25 \times 8 + 0.75 \times 4 = 2 + 3 = 5$. This equation indicates that if the average grade for the communication causal project enabler is not excellent (e.g, above 7) and the average grade for the leadership causal project enabler is very low (e.g., below 5) then the average grade for the schedule project performance measure will be low. If the project organization expects the average grade for the schedule project performance measure to always exceed 4 then it may have a business rule that states the following: if the average grade for communications is less than 4 and the average grade for leadership is less than 8 then a corrective action is required to improve schedule performance for a given project stage. The purpose of the corrective action is to increase the average grades for the communications and leadership causal project enablers which should increase the average grade for the schedule project performance measure. An example corrective action may be to provide communications and leadership training for the project manager. The present invention applies a relationship technique similar to that described above to relate each project performance measure to each causal project enabler. This enables a corrective action business rule to be identified that relates each project performance measure to each causal project enabler. Note that in some cases, the relationship between a project performance measure and a causal project enabler will be 0% (e.g., the corresponding multiplication factor, such as a1, a2, etc. is 0%). This indicates that the 0% causal project enabler has no impact on the corresponding project performance measure. In such case, no corresponding business rule or corrective action are required. However, an organization may choose to create business rules that ignore any causal project enabler whose multiplication factor is less than a specific threshold, such as 2%, rather than only ignoring causal project enablers whose multiplication factor is 0%. In this case, a causal project enabler whose multiplication factor is less 2% would not have a corresponding business rule or corrective action for the corresponding project performance measure.

f) The business rules are the means to recommend a corrective plan FIG. 18. For example, the project organization can setup a business rule 1701 in the present invention FIG. 17 that checks the results of each causal project enabler workflow and identifies situations where, for example, the average project enabler grade for schedule performance is less than 5 and the average project enabler grade for leadership is less than 4. The project organization can add a condition stating that if the business rule is "true" then recommend 1702 a refresher course on leadership skills for the project team leadership FIG. 17. If the business rule is false then this recommendation will not be included in the corrective action plan FIG. 18. At the end of each lessons learned process (where each project team member has completed each causal project enabler workflow and each project performance measure workflow requested by the project organization), the present invention will apply all of the business rules to the lessons learned answers stored in the WMS database. The present invention will then list, in the corrective action plan FIG. 18, the recommendation configured for each business rule where the condition is "true". The recommendation configured for each business rule where the condition is "false" will not be listed in the corrective action plan. In the first embodiment of the corrective action plan illustrated in FIG. 18, the recommendations 1804 are grouped by project 1801 then by project stage 1802 then by stage index 1803. The corrective resources capable of implementing each corrective action are listed next to the corresponding corrective action 1805.

g) The WMS is the means to capture answers to the questions that comprise each causal project enabler workflow (e.g., lessons learned). These answers are captured directly from each project team member. The BIS is the means to identify relationships between the causes and effects of control trends then diagnose and link those causes and effects then recommend a corrective action plan based on the business rules entered into the business rules form FIG. 17.

The first embodiment of the present invention includes the following steps to increase the transparency of information about project activities. This information will be made readily available to management with less filtering caused by organizational and personal bias. The project team will enter all key project activities into the present invention and update the status of those project activities in near real time. Project team members have an inherent incentive to keep this information current because it is their responsibility to report and manage risks in their area of responsibility. If a risk event occurs and that risk was not identified or mitigated effectively by the responsible project resource then that project resource will have to explain to management. The first embodiment of the present invention includes the following steps to record objective project control information that is unfiltered by organizational and resource bias and make that information available to organizational management in near real time.

a) In the present invention the answers to the questions in each causal project enabler workflow and each project performance measure are captured directly from project team members. This increases the transparency of information because it is not filtered by organizational biases or by the personal bias of project leads.

b) In addition, the questions in each causal project enabler workflow are designed to capture objective information about whether project enablers are increasing or reducing project control.

c) In the present invention all project team members can complete each causal project enabler workflow (e.g., the lessons learned process) at the same time as each other for a project stage or stage index. They can also complete the lessons learned process within 24 hours to one week of each other. It is therefore possible to capture all of the answers in near real time (defined as within 24 hours to one week). As soon as the answers are captured and stored in the WMS database the BIS can extract this information and generate the pre-determined reports for management.

The first embodiment of the present invention includes the following steps to provide access to objective project control data in near real time without burdening the project with excessive management reporting that does not contribute to completing the project's deliverables.

a) Given that periodic status tracking and reporting is typical for well managed projects, entering this information into the present invention and allowing the BIS to generate control reports in near real time (defined as within 24 hours to 1 week) will not burden the project with excessive management reporting. Rather, the BIS will generate the project control reports automatically.

The first embodiment of the present invention includes the following steps to make project timelines substantially predictable and the associated cost of project services, including project management services, substantially fixed.

a) As the present invention helps the project team track the performance of project activities in near real time, and identify causes of degraded performance and allows management to re-deploy appropriate resources to troubled projects prior to the delay of project stages, more project stages will be completed on time. This will make project timelines more predictable and will, in turn, make the cost of overhead project services, such as project management, more predictable. More predictable timelines and costs for project services will enable and encourage third party suppliers to offer those services on a fixed cost basis.

Figure 20:
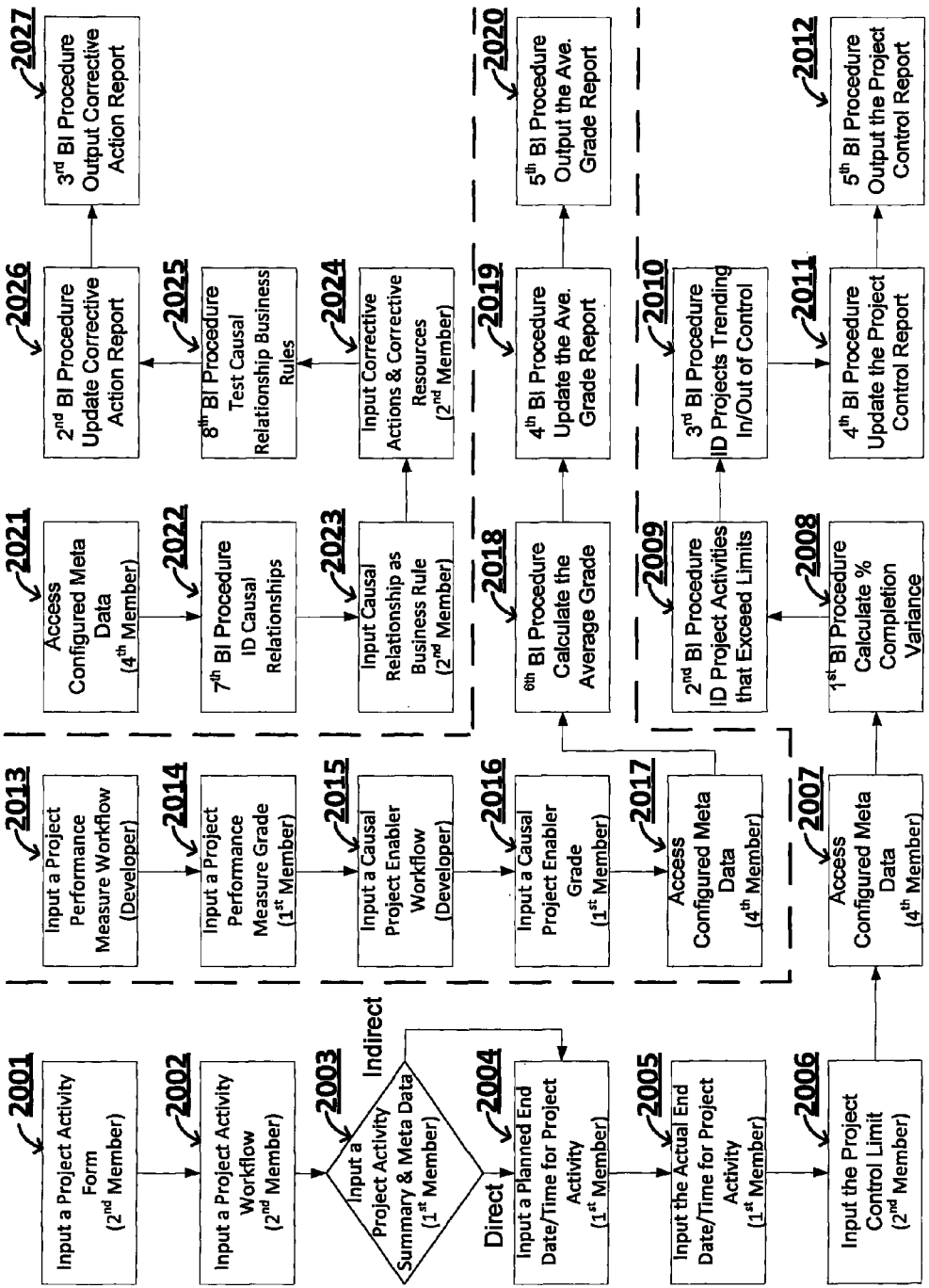
FIG. 20 illustrates a first embodiment of a summary of the present invention.

The following section is an overview and summary of the present invention. FIG. 19 illustrates a control chart that indicates whether a project stage is trending into control or trending out of control. FIG. 20 illustrates a summary of the first embodiment of the present invention. A first member of the project team, such as the project manager, is responsible for identifying and implementing at least one project activity. A second member of the project team is a business system analyst who is responsible for preparing the present invention for business use. A third member of the project team is a project sponsor who makes business decisions related to a project. A fourth member of the project team is a technical lead who is responsible for technical configuration of the present invention. These project team members collaborate in many ways to complete a project. For example, a second member of the project team may perform an analysis to determine a set of business requirements for the present invention then communicate those requirements to a fourth member of the project team to configure a business intelligence procedure to implement those requirements.

The developer of the present invention offers training to any project organization that chooses to use the present invention. This includes training for the second member of the project team on how to complete a project activity form analysis and how to create a project activity workflow analysis. The second member of the project team uses this training and the form editor interface FIG. 12 to input a project activity form 2001. The second member of the project team also uses this training and the workflow editor interface FIG. 11 to input a project activity workflow 2002.

One of the responsibilities of a first member of the project team is to identify the project activities that must be completed to complete a project. The project manager then compiles these project activities into a project plan. After a project activity is identified, a first member of the project team is responsible for tracking that project activity to completion by performing periodic reviews of the status of the project activity. In order to track a project activity, a first member of the project team can use the workflow operator user interface FIG. 8 to execute the project activity workflow. This project activity workflow prompts the first member of the project team to input a summary of the project activity and its associated meta data FIG. 13 2003. The project activity workflow then writes the summary 1301 and meta data into the project activity form. As an alternative to this indirect input method to the project activity form, the first member of the project team can input the summary of the project activity and its associated meta data directly into the project activity form that will be displayed in the output window 811 when executing the project activity workflow.

A first member of the project team can also use the workflow management system to input the planned end date and time 1303 for a project activity 2004. When a tracked project activity is completed, the first member of the project team can use the workflow management system to input the actual end date and time 1306 for a completed project activity 2005. All such meta data inputs can be direct or indirect as described above.

The training provided by the developer of the present invention also includes training for the second member of the project team on how to perform a project control limit analysis. The second member of the project team uses this training to specify then input each project control limit 2006 into the business intelligence system FIG. 6. Two project control limits shown in the project control chart illustrated in FIG. 19. One project control limit is configured for +10% 1901 and one project control limit is configured for −10% 1902.

The fourth member of the project team configures access to the meta data fields 2007 that are required to calculate the percentage completion variance for a completed project activity. The training provided by the developer of the present invention also includes training for the fourth member of the project team on how to perform a project activity completion meta data analysis that determines how to configure access to the meta data fields that are required to calculate the percentage completion variance for a completed project activity. A fourth member of the project team configures the business intelligence system to extract 601 this meta data and load it into the data warehouse 602 then use the analytic tools module 603 to calculate the percentage completion variance. Users can configure the business intelligence system to implement calculations and analyses by inputting queries and other business intelligence procedures that access the relevant data in the data warehouse then perform the required calculation or analysis then store the results in the data warehouse for future use in reports. The fourth member of the project team configures a first business intelligence procedure to use the plurality of data in the data warehouse to calculate the percentage completion variance 2008. For example, if the planned duration 1304 of a project activity was 10 days (planned end date 1303−planned start date 1302) and the actual duration 1307 (actual end date 1306−actual start date 1305) was twelve days then the percentage completion variance can be calculated as +20%, in this case (12−10)/10=20%. The training provided by the developer of the present invention also includes training for the second member of the project team on how to perform a percentage completion variance analysis. The second member of the project team uses this training to determine how to calculate the percentage completion variance. The present invention triggers the first business intelligence procedure when a first member of the project team inputs an end date and time for a completed project activity.

The fourth member of the project team configures a second business intelligence procedure to identify each completed project activity that has a percentage completion variance that exceeds a project control limit 2009. For example, if the second member of the project team sets a project control limit to 10% and the actual percentage completion variance is 20%, for a specific completed project activity, then that completed project activity has exceeded that project control limit by 20%−10%=10%. The training provided by the developer of the present invention also includes training for the second member of the project team on how to perform a control limit comparison analysis. The second member of the project team uses this training to determine how to measure whether a percentage completion variance has exceeded a project control limit. In addition, the fourth member of the project team configures a third business intelligence procedure that identifies each project stage that is trending out of control and each project stage that is trending into control 2010. The third business intelligence procedure is triggered by the execution of the second business intelligence procedure.

After completing the project control limit analysis, the second member of the project team also completes a project control trend analysis. This project control trend analysis specifies the rules for determining when a project stage is regarded as being out of control. For example, one project organization may specify that a project stage is out of control if the percentage completion variance exceeds a project control limit for eight successive completed project activities. This is the default setting for the first embodiment of the present invention. However, a number of alternative project control rules can be configured, such as a project is out of control if the percentage completion variance for 4 out of 5 successive completed project activities exceeds a project control limit. Other alternative rules are specified in different statistical process control documents, such as Statistical Process Control Rules, The Western Electric Rules Explained, Martin Bell, Feb. 21, 2009, Suite101.com. By way of example, FIG. 19 illustrates project control limits at +10% 1901 and −10% 1902. FIG. 19 also illustrates three percentage completion variances that exceed the +10% project control limit namely points 1903, 1904 and 1905. The next percentage completion variance 1906 is within the project control limits but percentage completion variance 1907 also exceeds the +10% project control limit. In this example, 4 out of 5 successive completed project activities exceed the +10% project control limit. In FIG. 19, the horizontal axis for the project control chart is the percentage completion variance for each project activity that is completed in chronological order. If all project activities are completed within the project control limits then the project stage will be completed on time (e.g., within the predicted timeline). A project control chart can therefore be used to illustrate that a project control stage is being completed with a substantially predictable timeline.

If a project stage does not meet the test for being out of control then it is regarded as being in control. The same information used to determine whether a project stage is out of control or whether a project stage is trending out of control can therefore be used to determine whether a project stage is in control or trending into control. For example, if a project organization chooses to use the default rule for project control and 3 successive completed project activities exceed a project control limit followed by 4 project activities that do not exceed a project control limit further followed by 5 successive completed project activities the exceed a project control limit then the project team can speculate that the project stage is heading out of control and take corrective action before 8 successive completed project activities exceed a project control limit. In this example, the trend is from 3 to 5 and possibly to 8 successive completed project activities exceeding a project control limit. Similarly, if 5 successive completed project activities exceed a project control limit followed by 4 project activities that do not exceed a project control limit further followed by 3 successive completed project activities that exceed a project control limit then the project team can speculate that the project stage is heading into control. Note that a project organization can also use other information to help determine whether a project is trending out of control. For example, one project organization may also choose to use the number of unplanned project activities, the number of unauthorized project activities and the number of unscheduled project activities that have been completed to indicate the level of control. One project organization may configure a business intelligence procedure to identify project stages where more than 5% of the project activities are unplanned or more than 0 project activities are unauthorized or more than 1 completed project activity was unscheduled. That project organization may consider that these thresholds also indicate whether a project stage is out of control. For projects that are in control or trending into control, corrective resources can be made available for reallocation to projects that are trending out of control. It is up to each project organization to select and configure the project control rules that best meet the needs of their organization.

The fourth member of the project team configures a fourth business intelligence procedure to update the project control report periodically. The training provided by the developer of the present invention also includes training for the second member of the project team on how to perform a periodic update analysis and a report output analysis. The second member of the project team uses this training to determine the configuration requirements for the fourth and fifth business intelligence procedures. The project organization can select the update frequency to match their specific business needs. For example, one organization may configure the periodic updates for their project control reports to occur once per week on each Sunday morning at 2:00 AM while another organization may configure these updates to occur multiple times per day, such as each hour on the hour. Once configured, the fourth business intelligence procedure updates the project control report 2011 with the specified frequency. The fourth member of the project team configures a fifth business intelligence procedure to output the updated project control report. Once configured, the fifth business intelligence procedure that outputs the project control report 2012 is triggered periodically by the fourth business intelligence procedure.

The developer of the present invention creates and inputs at least one project performance measure workflow for each project performance measure 2013, such as schedule performance, cost performance, scope performance and quality performance as described above. The creation of the first version of each performance measure workflow was the result of a project performance measure workflow analysis by the developer of the present invention. An example of this type of analysis is described above for the schedule performance measure workflow. When requested by a third member of the project team, each first member of the project team will execute each project performance measure workflow. In response to at least one of the questions in each project performance measure workflow, each first member of the project team will input a grade for each project performance measure 2014.

The developer of the present invention also creates and inputs at least one causal project enabler workflow for each causal project enabler 2015, such as resources, leadership, communication and roles as described above. The creation of the first version of each causal project enabler workflow was the result of a causal project enabler workflow analysis by the developer of the present invention. An example of this type of analysis is described above for the leadership causal project enabler workflow. When requested by a third member of the project team, each first member of the project team will execute each causal project enabler workflow. In response to at least one of the questions in each causal project enabler workflow, each first member of the project team will input a grade for each causal project enabler 2016.

The fourth member of the project team configures access for the business intelligence system to the meta data fields 2017 that are written to by the project performance measure workflow and causal project enabler workflow including the meta data fields that contain each project performance measure grade and each causal project enabler grade. The fourth member of the project team completes an average grade meta data analysis to determine which fields to extract from the data storage system then load into the data warehouse in order for the business intelligence system to calculate each average grade for an average grade report. The workflow management system FIG. 10 stores grade information in a specific field in a specific table in the project activity database 1006. The CCS is operatively coupled to the workflow management system and the data storage system and copies this grade information from the workflow management system to the data storage system and stores the grade information in the project activity database 503. The training provided by the developer of the present invention includes training for a fourth member of the project team on how to perform an average grade meta data analysis which includes how to access the grade information from the project activity database 503. The training provided by the developer of the present invention also includes training for a second member of the project team on how to perform an average grade analysis. The second member of the project team performs an average grade analysis to determine how to calculate the average grade from the individual grades. If each individual grade is a number between 1 and 10 then the average grade is simply the sum of all grades for a particular project performance measure or a particular causal project enabler divided by the number of grades for that same project performance measure or that same causal project enabler. For example, if the plurality of data in the data warehouse includes two grades for the schedule performance measure, one grade equal to 5 and one grade equal to 7, then the average grade for that schedule performance measure is (5+7)/2=6. The fourth member of the project team uses the average grade meta data analysis training to configure a sixth business intelligence procedure to calculate an average grade for each project performance measure and to calculate an average grade for each causal project enabler 2018. The present invention triggers the sixth business intelligence procedure when a first member of the project team inputs a grade for a causal project enabler or inputs a grade for a project performance measure.

The fourth member of the project team configures the fourth business intelligence procedure to update the average grade report periodically. The project organization can select the update frequency to match their business needs. For example, one organization may configure the periodic updates for their average grade reports to occur once per week while another may configure these updates to occur multiple times per day. Once configured, the fourth business intelligence procedure updates the average grade report 2019 with the specified frequency. The fourth member of the project team configures the fifth business intelligence procedure to output the average grade report. Once configured, the fifth business intelligence procedure that outputs the project control report 2020 is triggered periodically by the fourth business intelligence procedure. A single business intelligence procedure can be configured to update or output multiple reports with different frequencies or with the same frequency.

The fourth member of the project team configures access for the business intelligence system to the meta data fields 2021 required to identify at least one causal relationship between a driver of project control, such as a causal project enabler, and each project performance measure. The fourth member of the project team completes a causal relationship meta data analysis to determine which fields to extract from the data storage system then load into the data warehouse in order for the business intelligence system to identify at least one causal relationship. The training provided by the developer of the present invention includes training for the fourth member of the project team on how to perform a causal relationship meta data analysis. The data that can be used to identify relationships between a causal project enabler and a project performance measure includes each average grade and the other information that is captured from each first member of the project team when executing the causal project enabler workflow and the project performance measure workflow. Many business intelligence techniques, such as a regression analysis, can use the average grades described in this disclosure to identify relationships between a causal project enabler and a project performance measure (U.S. Pub. No. US20080243912).

The fourth member of the project team configures a seventh business intelligence procedure to identify causal relationships between each causal project enabler and each project performance measure periodically 2022. Information about causal project enablers and project performance measures, such as average grades, is included in the plurality of data stored in the data warehouse. The seventh business intelligence procedure executes a periodic causal relationship analysis on the plurality of data in the data warehouse. Executing the seventh business intelligence procedure identifies causal relationships between each causal project enabler and each project performance measure. The seventh business intelligence procedure can use a number of techniques to identify relationships, such as using a regression analysis on the data in the data warehouse. The second member of the project team reviews each causal relationship then inputs each causal relationship into the business intelligence system as a business rule 2023. The developer of the present invention includes training on interpreting causal relationships as business rules. For each business rule, the second member of the project team also inputs a corrective action that can resolve the issue represented by a business rule and also inputs a corrective resource who can implement the recommended corrective action 2024. For example, the seventh business intelligence procedure may identify a strong relationship between effective communication and schedule performance. The second member of the project team may convert that relationship into a business rule such as if the average grade for communication is less than 4 and the average grade for schedule performance is less than 3 then the recommended corrective action is to "improve communication during project meetings". Note that if the average grade for communication is low (e.g., less than 5) then the members of the project team are assigning low grades for communication which usually indicates that there is or was a communication problem during a project stage. In such as case, the second member of the project team may input one of the following recommended corrective resources "a new project manager" or "a communication trainer for the existing project manager". These corrective resources are capable of resolving the issue identified as poor communication during project meetings. The training provided by the developer of the present invention will help the second member of the project team to use other answers to the questions posed in the communication causal project enabler workflow and the schedule performance measure workflow to support the proposed business rule and the proposed corrective resource. For example, other responses to questions in the causal project enabler workflow or project performance measure workflow may also indicate that project meetings are ineffective or that communication is poor. Of course, this same type of analysis can be applied to the other causal project enablers and other project performance measures.

The fourth member of the project team configures an eighth business intelligence procedure to test at least one causal relationship business rule periodically 2025. For example, the eighth business intelligence procedure can test the following question "is the average grade for the communication causal project enabler less than 4 and the average grade for the schedule project performance measure less than 3" for a specified project stage. The training provided by the developer of the present invention includes training for the second member of the project team on how to perform a causal relationship business rule analysis. The second member of the project team can then determine the appropriate rules to configure for the eighth business intelligence procedure. The eighth business intelligence procedure will execute itself periodically to test each business rule and determine whether to recommend each corrective action associated with each business rule for a given project stage. For example, if the average grade for the communication causal project enabler is less than 4 and the average grade for the schedule project performance measure is less than 3 for a specific project stage then the recommended corrective actions and the recommended corrective resources for that business rule will be listed in the corrective action report for that specific project stage.

The fourth member of the project team configures the fourth business intelligence procedure to update the corrective action report periodically. The project organization can select the update frequency to match their business needs. For example, one organization may configure the periodic updates for their corrective action reports to occur once per week while another may configure these updates to occur multiple times per day. Once configured, the fourth business intelligence procedure updates the corrective action report 2026 with the specified frequency. The fourth member of the project team configures the fifth business intelligence procedure to output the corrective action report. Once configured, the fifth business intelligence procedure that outputs the corrective action report 2027 is triggered periodically by the fourth business intelligence procedure.

The present invention can display a first group of reports that provides information for a dynamic reallocation of at least one corrective resource. This first group of reports includes an average grade report 2020, a corrective action report 2027 and a project control report 2012. The fifth business intelligence procedure is used to output this first group of reports that illustrates a project stage being in control. This first group of reports enables a third member of the project team to:
  a. identify each project stage that is trending out of control;
  b. identify each project stage that is trending into control; and
  c. identify each corrective resource required to implement each corrective action that is required to bring into control each project stage that is trending out of control.

The third member of the project team can then reallocate the identified corrective resources from a second project that has a project stage that is trending into control to a first project that has a project stage that is trending out of control to implement each identified corrective action and complete the project stage within the predicted timeline.

The present invention can display a second group of reports that illustrate a project stage being completed within a substantially predictable timeline. The fifth business intelligence procedure is used to output at least one report including the project control report that illustrates a project stage being in control. At least one supplier can use this report to confirm that project activities are being completed within their project control limits and therefore project stages are being completed within their predicted timelines. If each project activity is completed within its control limits then the project stage will be completed substantially within its predicted timeline. This will encourage at least one supplier to offer at least one project service to the project organization at a substantially fixed price. For example, the cost of a project manager is usually proportional to the duration of each project stage. If the duration of each project stage is substantially fixed then a supplier will be willing to offer project management services, and other services with a similar cost structure, at a substantially fixed price.

The information disclosed above explains how, in combination, the central control system 201, user interfaces 202 and 209, data storage system 210, business intelligence system 211, and workflow management system 212 are the means to apply statistical process control techniques to project activities to provide access to objective project control data, facilitate project control activities, make project timelines substantially predictable, make the cost of project services substantially fixed, facilitate dynamic reallocation of project resources and indicate which causal project enablers are increasing project control and which are reducing project control. The applicant is not aware of any other commercially viable system that offers this combination of novel, useful and non-obvious features.

The present invention also has a plurality of potential revenue streams including selling the system to client organizations, offering the apparatus as a service and offering professional services including installation, maintenance and training. Anyone skilled in the art will recognize that the method and apparatus of the present invention has many applications and advantages, and that the present invention is not limited to the representative examples and variations disclosed herein. In addition, the scope of the present invention covers conventional variations and modifications to the components of the present invention, which are known to those who are skilled in the art.

I claim:

1. A method for managing project control using a project control system comprising:
  a) inputting and updating at least one decision tree workflow in said project control system, the decision tree workflow comprising a sequence of questions, each question having at least one answer option, the questions and answer options being designed to survey at least one project team member whereby the survey responses indicate which causal project enablers are driving a project out of control and which causal project enablers are driving said project into control;
  b) inputting and updating at least one project activity workflow into said project control system, the project activity workflow being a sequence of input prompts comprising a project organization's preferred method to input and update a project activity and also to input and update a plurality of project activity meta data associated with each said project activity;
  c) executing said project activity workflow in said project control system to input and update said project activity and to input and update said plurality of project activity meta data;
  d) calculating a percentage completion variance for said project activity in said project control system, said percentage completion variance being a quantity of actual duration of said project activity minus a planned duration of said project activity, said quantity divided by said planned duration of said project activity;

e) comparing said percentage completion variance with a predetermined project control limit, the percentage completion comparison being performed by said project control system;

f) executing said decision tree workflow in said project control system to obtain a plurality of project performance information including at least one causal project enabler grade and at least one project performance measure grade;

g) calculating an average grade for a project performance measure and also calculating an average grade for a causal project enabler, the average grade calculation being performed in said project control system, where the average grade of the project performance measure is calculated as a sum of individual grades for a plurality of said project performance measures divided by a total number of graded project performance measures, and the average grade of the causal project enablers is calculated as a sum of individual grades for a plurality of said causal project enablers divided by a total number of graded causal project enablers;

h) outputting project reports including at least one project control report and at least one average grade report, wherein the average grade report comprising said average grade of each said causal project enabler and said average grade of each said project performance measure, wherein the project control report comprising said percentage completion variance and said predetermined project control limit for each said project activity;

i) determining each project stage that is trending out of control and determining each project stage that is trending into control, the trend determination is performed by the said project control system, the trend determination uses multiple criteria including: determining whether said percentage completion variance for eight successive completed project activities exceed a first predetermined project control limit and determining whether said percentage completion variance for four out of five successive completed project activities exceed a second predetermined project control limit;

j) determining at least one causal relationship between at least one said causal project enabler and at least one said project performance measure, the causal relationship being determined by said project control system using at least one of a plurality of causal relationship calculation techniques including a regression analysis;

k) inputting and updating at least one business rule that relates at least one cause and at least one effect of project failure, the business rule being input and updated in said project control system, said business rule being a logical equation that represents said causal relationship between the cause and the effect of project failure and includes at least one said causal project enabler grade and at least one said project performance measure grade, whereby said logical equation generates a result that is one of acceptable and unacceptable, and said result is unacceptable when said at least one causal project enabler grade and said at least one said project performance measure grade each have a value that is unacceptable for their individual logical comparison with their individual predetermined threshold as specified in said logical equation;

l) associating at least one corrective action with each said business rule in said project control system and outputting said corrective action into a corrective action report when a result of an evaluation of said business rule is unacceptable, where the corrective action is a predetermined sequence of activities that are known to have resolved said cause and said effect of project failure on at least one previous project;

m) associating the name of at least one corrective resource with said corrective action in said project control system, whereby the corrective resource must be capable of implementing said corrective action and must be available for reallocation to said project that is trending out of control;

n) executing said business rule in said project control system and outputting at least one said corrective action and at least one said corrective resource in a corrective action report;

o) outputting a first group of reports that provide information for a dynamic reallocation of said at least one corrective resource, said first group of reports comprising a plurality of causal relationship information including said project control report, said average grade report and said corrective action report;

p) outputting a second group of reports that illustrate a said project stage being completed within a predictable timeline, said second group of reports comprising a plurality of project control information including said project control report, q) whereby said project control system analyses answers to questions from said decision tree workflow and further analyses responses to prompts from said project activity workflow to identify said project stage that is heading out of control then identifies said cause for said project stage heading out of control then identifies said corrective action and said corrective resource that will improve project control then recommends the reallocation of said corrective resource dynamically to said project to implement said corrective action for the purposes of completing said project stage within a defined timeline.

2. A project control system for managing project control, comprising:

a) a computer implemented central control system operatively coupled to each of:
  a. at least one computer implemented user interface;
  b. a data storage system;
  c. a workflow management system; and
  d. a business intelligence system;

b) a computer implemented user interface configured to provide access to said project control system including:
  a. a main hardware comprised of a conventional computer;
  b. an operating system configured to control the execution of at least one software application;
  c. a plurality of software applications each configured to perform at least one function including a browser configured to browse the internet;
  d. an input device configured to receive at least one input; and
  e. an output device configured to display at least one output;

c) a data storage system comprising a plurality of databases configured to store a plurality of database data used by said project control system;

d) a workflow management system configured to perform input and update tasks comprising:
  a. a workflow user interface configured to perform a plurality of workflow actions including input, update and delete at least one workflow;
  b. an operator mode user interface configured to perform a plurality of operator actions including execute a workflow; and c. a form user interface configured to perform a plurality of form actions including input, update and delete at least one form;
e) a business intelligence system configured to analyze data and output at least one project report comprising
   a. an extract, transform and load data module configured to extract, transform and load said plurality of database data from said data storage system into a data warehouse module;
   b. said data warehouse module comprised of a database configured to store a plurality of data that includes a predetermined subset of said plurality of database data;
   c. an analytical tools module configured to analyze and model business issues;
   d. a data mining module configured to discover trends, patterns and relationships in said plurality of data;
   e. a reporting tools module configured to create at least one report; and
   f. a presentation layer module configured to use graphics and multimedia interfaces to output a report,
said project control system being configured to perform the steps of:
a) inputting and updating at least one decision tree workflow in said project control system, the decision tree workflow comprising a sequence of questions, each question having at least one answer option, the questions and answer options being designed to survey at least one project team member whereby the survey responses indicate which causal project enablers are driving a project out of control and which causal project enablers are driving said project into control;
b) inputting and updating at least one project activity workflow into said project control system, the project activity workflow being a sequence of input prompts comprising a project organization's preferred method to input and update a project activity and also to input and update a plurality of project activity meta data associated with each said project activity;
c) executing said project activity workflow in said project control system to input and update said project activity and to input and update said plurality of project activity meta data;
d) calculating a percentage completion variance for said project activity in said project control system, said percentage completion variance being a quantity of actual duration of said project activity minus a planned duration of said project activity, said quantity divided by said planned duration of said project activity;
e) comparing said percentage completion variance with a predetermined project control limit, the percentage completion comparison being performed by said project control system;
f) executing said decision tree workflow in said project control system to obtain a plurality of project performance information including at least one causal project enabler grade and at least one project performance measure grade;
g) calculating an average grade for a project performance measure and also calculating an average grade for a causal project enabler, the average grade calculation being performed in said project control system, where the average grade of the project performance measure is calculated as a sum of individual grades for a plurality of said project performance measure divided by a total number of graded project performance measure, and the average grade of the causal project enabler is calculated as a sum of individual grades for a plurality of said causal project enabler divided by a total number of graded causal project enabler;
h) outputting project reports including at least one project control report and at least one average grade report, wherein the average grade report comprising said average grade of each said causal project enabler and said average grade of each said project performance measure, wherein the project control report comprising said percentage completion variance and said predetermined project control limit for each said project activity;
i) determining each project stage that is trending out of control and determining each project stage that is trending into control, the trend determination is performed by the said project control system, the trend determination uses multiple criteria including: determining whether said percentage completion variance for eight successive completed project activities exceed a first predetermined project control limit and determining whether said percentage completion variance for four out of five successive completed project activities exceed a second predetermined project control limit;
j) determining at least one causal relationship between at least one said causal project enabler and at least one said project performance measure, the causal relationship being determined by said project control system using at least one of a plurality of causal relationship calculation techniques including a regression analysis;
k) inputting and updating at least one business rule that relates at least one cause and at least one effect of project failure, the business rule being input and updated in said project control system, said business rule being a logical equation that represents said causal relationship between the cause and the effect of project failure and includes at least one said causal project enabler grade and at least one said project performance measure grade, whereby said logical equation generates a result that is one of acceptable and unacceptable, and said result is unacceptable when said at least one causal project enabler grade and said at least one said project performance measure grade each have a value that is unacceptable for their individual logical comparison with their individual predetermined threshold as specified in said logical equation;
l) associating at least one corrective action with each said business rule in said project control system and outputting said corrective action into a corrective action report when a result of an evaluation of said business rule is unacceptable, where the corrective action is a predetermined sequence of activities that are known to have resolved said cause and said effect of project failure on at least one previous project;
m) associating the name of at least one corrective resource with said corrective action in said project control system, whereby the corrective resource must be capable of implementing said corrective action and must be available for reallocation to said project that is trending out of control;
n) executing said business rule in said project control system and outputting at least one said corrective action and at least one said corrective resource in a corrective action report;
o) outputting a first group of reports that provide information for a dynamic reallocation of said at least one corrective resource, said first group of reports comprising a plurality of causal relationship information including said project control report, said average grade report and said corrective action report;

p) outputting a second group of reports that illustrate said project stage being completed within a predictable timeline, said second group of reports comprising a plurality of project control information including said project control report, q) whereby said project control system analyses answers to questions from said decision tree workflow and further analyses responses to prompts from said project activity workflow to identify said project stage that is heading out of control then identifies said cause for said project stage heading out of control then identifies said corrective action and said corrective resource that will improve project control then recommends the reallocation of said corrective resource dynamically to said project to implement said corrective action for the purposes of completing said project stage within a defined timeline.

3. The method of claim 1, wherein:
   a. said project performance measure grade is a measure of at least one project performance measure including scope, cost, schedule and quality; and
   b. said causal project enabler grade is a measure of at least one cause of project failure including business case, business management, project communications, project customers, project leadership, project processes, project management, project requirements, project risks, resource roles, project suppliers, project support and resources, project teamwork, project technology, project value and project timing.

4. The method of claim 1 wherein said decision tree workflow is comprised of said sequence of questions and said sequence of questions is grouped into a plurality of causal project enabler workflows and a plurality of project performance measure workflows, wherein one of said plurality of causal project enabler workflows is a leadership causal project enabler workflow, and the sequence of questions that comprise said leadership causal project enabler workflow include the following questions:
   a. did this stage of the project have a clear vision, what were the key reasons for the vision being clear or unclear, what activities could have clarified the vision or could have improved its effectiveness, was the project's strategy effective, what specific activities made the strategy effective or ineffective, were the project's vision and strategy communicated effectively, what specific actions made the communication effective or ineffective, were the members of the project team motivated effectively, what specific actions made the motivation effective or ineffective, what was most effective about project leadership, what was least effective about project leadership, what specific actions could have been implemented differently to improve leadership, and what grade is a fair measure of project leadership for the project stage and stage index.

5. The method of claim 1, wherein said plurality of project stage control methods include:
   a. measuring whether said project enabler is contributing to drive said project stage out of control by determining said causal relationship between said project performance measure and said causal project enabler and further determining whether:
      i. said average of said causal project enabler grade is one of declining and less than a first predetermined project control threshold; and
      ii. said average of said project performance measure grade is one of declining and less than a second predetermined project control threshold; and
   b. measuring whether said project enabler is contributing to drive said project stage into control by determining said causal relationship between said project performance measure and said causal project enabler and further determining whether:
      i. said average of said causal project enabler grade is one of increasing and more than a third predetermined project control threshold; and
      ii. said average of said project performance measure grade is one of increasing and more than a fourth predetermined project control threshold.

6. The method of claim 1, wherein said plurality of project stage control methods include:
   a. measuring a lateness of a past due activity and comparing said lateness with a predetermined lateness project control limit, where said lateness of said past due activity is the difference between the target completion time and the actual completion time for said past due activity;
   b. measuring a rate of change of the average lateness of a plurality of said past due activities for said project stage and comparing said rate of change of said average lateness with a predetermined rate of change of lateness project control limit, where said rate of change of said average lateness of said plurality of said past due activities is measured by comparing said average lateness of said past due project activities over time for said project stage;
   c. measuring a number of unplanned activities for said project stage and comparing said number of unplanned activities with a predetermined unplanned project control limit, where said number of unplanned activities is measured by counting the number of project activities that:
      i. are required to complete said project stage; and
      ii. were not in the original project plan;
   d. measuring a rate of change of said number of unplanned activities for said project stage and comparing said number of unplanned activities with a predetermined rate of change of unplanned activities project control limit, where said rate of change of said number of unplanned activities is measured by comparing said number of unplanned activities over time for said project stage;
   e. measuring a number of unscheduled and unauthorized activities for said project stage and comparing said number of unscheduled and unauthorized activities with a predetermined unscheduled and unauthorized project control limit, where said number of unscheduled and unauthorized activities is measured by counting the number of project activities that were started that were not at least one of scheduled and authorized for said project stage; and
   f. measuring a rate of change of said number of unscheduled and unauthorized activities for said project stage and comparing said number of unscheduled and unauthorized activities with a predetermined rate of change of unscheduled and unauthorized activities project control limit, where said rate of change of said number of unscheduled and unauthorized activities is measured by comparing said number of unscheduled and unauthorized activities over time for said project stage.

7. The method of claim 1, wherein said plurality of causal relationship calculation techniques include neural networks, neuro-fuzzy systems, fuzzy systems, regression trees, and linear regression.

8. The method of claim 1, wherein said project control system receives an input of said at least one business rule and further receives updates to said at least one business rule, where one of said at least one business rule is to recommend a refresher course on leadership skills for the project team leadership when said average of said project performance measure grade for schedule performance is less than five and said average of said causal project enabler grade for leadership is less than four.

9. The method of claim 1, wherein said project control system executes said decision tree workflow, the execution of said decision tree workflow comprising:
   a. displaying a menu comprised of a list of said causal project enabler workflows and further comprised of a list of said project performance measure workflows, whereby said project control system receives a selection of a workflow to execute;
   b. receiving a selection of said project stage;
   c. receiving a selection of a project index;
   d. receiving a selection of one of said causal project enabler workflows and said project performance measure workflows, the selected workflow being executed by said project control system after it is selected on said menu;
   e. displaying a previous completion status of said selected workflow;
   f. providing an option to implement one of:
      i. execute said selected workflow; and
      ii. return to said menu;
   g. executing said workflow comprising the steps of:
      i. displaying a first question;
      ii. receiving a first input;
      iii. displaying a next question;
      iv. receiving a next input;
      v. selecting one of displaying another next question and ending said workflow; and
      vi. ending said workflow comprising the steps of:
         1. marking said selected workflow as complete for a combination of said project stage and said project index; and
         2. returning to said menu.

10. The method of claim 1, wherein said project control system executes said project activity workflow comprising:
    a. executing a setup command, said setup command configures the windows that comprise the user interface;
    b. receiving a project activity selection, said project activity selection being one of:
       i. open an existing project activity; and
       ii. open a new project activity;
    c. executing a first branch command, said first branch command directing said project activity workflow to execute one of:
       i. opening a project activity form and populating said project activity form with information for an existing project activity when an option is selected on said project control system to open said existing project activity; and
       ii. opening said project activity form when an option is selected on said project control system to open said new project activity, whereby said project activity form is blank;
    d. executing a position command, said position command positions said project control system's cursor at a current field in said project activity form, the current field being one of:
       i. the first field in said project activity form; and
       ii. the field after the previous field that was updated;
    e. executing a first display command, said first display command displays a plurality of pre-determined instructions in a user instructions window;
    f. executing a first input command, said first input command receives an input of information about said project activity;
    g. executing a first clear command, said first clear command clears said instructions in said user instructions window;
    h. executing a second display command, said second display command displays at least one instruction in said user instructions window;
    i. executing a second branch command, said second branch command directs said project control system to execute one of:
       i. a first write command, said first write command writes the information entered in said input window to said current field in said project activity form then executes a second position command that positions said project control system's cursor at a next field in said project activity form;
       ii. executing a milestone command to position said project control system's cursor at a field in said project activity form that corresponds with the milestone selected in a milestone window, where each field in said project activity form has one corresponding milestone and said project control system displays each milestone in said milestones window; and
       iii. executing an exit command, said exit command providing an option to save the changes in the project activity form prior to exiting said workflow;
    j. executing a second clear command, said second clear command clears said instructions in said user instructions window; and
    k. executing said second display command again, to repeat the commands that display said next question and receive an input in response to said next question.

11. The method of claim 10, wherein updating at least one project activity workflow comprises:
    a. opening an existing project activity workflow and executing one of:
       i. receiving an input to add a new command, the addition of said new command performs a plurality of adding tasks in said project control system including adding an entry for that command into a command parameters database;
       ii. receiving an input to edit one of an existing command and said new command, the edit of a specified command performs a plurality of edit tasks in said project control system including editing information in a parameters field for said specified command in a command parameters database; and
       iii. receiving an input to delete one of said existing command and said new command, the deletion of an unrequired command performs a plurality of deletion tasks in said project control system including deleting an entry for that command in said command parameters database and deleting an entry for that command in a next step database;
    b. interconnecting a first command and a second command, the interconnection comprising one of:
       i. performing a plurality of connection tasks in said project control system including changing an entry in said next step database, where said project control system executes said second command after said first command; and ii. performing a plurality of disconnection tasks in said project control system including deleting an entry in said next step database, where said project control system no longer executes said second command after said first command; and c. saving a change to said project activity workflow where said change is stored permanently in a project control system database.

12. The project control system recited in claim 2, wherein:
a. said project performance measure grade is a measure of at least one project performance measure including scope, cost, schedule and quality; and
b. said causal project enabler grade is a measure of at least one cause of project failure including business case, business management, project communications, project customers, project leadership, project processes, project management, project requirements, project risks, resource roles, project suppliers, project support and resources, project teamwork, project technology, project value and project timing.

13. The project control system recited in claim 2, wherein said decision tree workflow is comprised of said sequence of questions and said sequence of questions is grouped into a plurality of causal project enabler workflows and a plurality of project performance measure workflows, where one of said plurality of causal project enabler workflows is a leadership causal project enabler workflow, and the sequence of questions that comprise said leadership causal project enabler workflow include the following questions:
a. did this stage of the project have a clear vision, what were the key reasons for the vision being clear or unclear, what activities could have clarified the vision or could have improved its effectiveness, was the project's strategy effective, what specific activities made the strategy effective or ineffective, were the project's vision and strategy communicated effectively, what specific actions made the communication effective or ineffective, were the members of the project team motivated effectively, what specific actions made the motivation effective or ineffective, what was most effective about project leadership, what was least effective about project leadership, what specific actions could have been implemented differently to improve leadership, and what grade is a fair measure of project leadership for the project stage and stage index.

14. The project control system recited in claim 2, wherein said plurality of project stage control methods include:
a. measuring whether said project enabler is contributing to drive said project stage out of control by determining said causal relationship between said project performance measure and said causal project enabler and further determining whether:
i. said average of said causal project enabler grade is one of declining and less than a first predetermined project control threshold; and
ii. said average of said project performance measure grade is one of declining and less than a second predetermined project control threshold; and
b. measuring whether said project enabler is contributing to drive said project stage into control by determining said causal relationship between said project performance measure and said causal project enabler and further determining whether:
i. said average of said causal project enabler grade is one of increasing and more than a third predetermined project control threshold; and ii. said average of said project performance measure grade is one of increasing and more than a fourth predetermined project control threshold.

15. The project control system recited in claim 2, wherein said plurality of project stage control methods include:
a. measuring a lateness of a past due activity and comparing said lateness with a predetermined lateness project control limit, where said lateness of said past due activity is the difference between the target completion time and the actual completion time for said past due activity;
b. measuring a rate of change of the average lateness of a plurality of said past due activities for said project stage and comparing said rate of change of said average lateness with a predetermined rate of change of lateness project control limit, where said rate of change of said average lateness of said plurality of said past due activities is measured by comparing said average lateness of said past due project activities over time for said project stage;
c. measuring a number of unplanned activities for said project stage and comparing said number of unplanned activities with a predetermined unplanned project control limit, where said number of unplanned activities is measured by counting the number of project activities that:
i. are required to complete said project stage; and
ii. were not in the original project plan;
d. measuring a rate of change of said number of unplanned activities for said project stage and comparing said number of unplanned activities with a predetermined rate of change of unplanned activities project control limit, where said rate of change of said number of unplanned activities is measured by comparing said number of unplanned activities over time for said project stage;
e. measuring a number of unscheduled and unauthorized activities for said project stage and comparing said number of unscheduled and unauthorized activities with a predetermined unscheduled and unauthorized project control limit, where said number of unscheduled and unauthorized activities is measured by counting the number of project activities that were started that were not at least one of scheduled and authorized for said project stage; and
f. measuring a rate of change of said number of unscheduled and unauthorized activities for said project stage and comparing said number of unscheduled and unauthorized activities with a predetermined rate of change of unscheduled and unauthorized activities project control limit, where said rate of change of said number of unscheduled and unauthorized activities is measured by comparing said number of unscheduled and unauthorized activities over time for said project stage.

16. The project control system recited in claim 2, wherein said plurality of causal relationship calculation techniques include neural networks, neuro-fuzzy systems, fuzzy systems, regression trees, and linear regression.

17. The project control system recited in claim 2, wherein said project control system receives an input of said at least one business rule and further receives updates to said at least one business rule, where one of said at least one business rule is to recommend a refresher course on leadership skills for the project team leadership when said average of said project performance measure grade for schedule performance is less than five and said average of said causal project enabler grade for leadership is less than four.

18. The project control system recited in claim 2, wherein said project control system executes said decision tree workflow, the execution of said decision tree workflow comprising:
   a. displaying a menu comprised of a list of said causal project enabler workflows and further comprised of a list of said project performance measure workflows, whereby said project control system receives a selection of a workflow to execute;
   b. receiving a selection of said project stage;
   c. receiving a selection of a project index;
   d. receiving a selection of one of said causal project enabler workflows and said project performance measure workflows, the selected workflow being executed by said project control system after it is selected on said menu;
   e. displaying a previous completion status of said selected workflow;
   f. providing an option to implement one of:
     i. execute said selected workflow; and
     ii. return to said menu;
   g. executing said workflow comprising the steps of:
     i. displaying a first question;
     ii. receiving a first input;
     iii. displaying a next question;
     iv. receiving a next input;
     v. selecting one of displaying another next question and ending said workflow, and
     vi. ending said workflow comprises the steps of:
       1. marking said selected workflow as complete for a combination of said project stage and said project index; and
       2. returning to said menu.

19. The project control system recited in claim 2, wherein executing said project activity workflow comprises:
   a. executing a setup command, said setup command configures the windows that comprise the user interface;
   b. receiving a project activity selection, said project activity selection being one of:
     i. open an existing project activity; and
     ii. open a new project activity;
   c. executing a first branch command, said first branch command directing said project activity workflow to execute one of:
     i. opening a project activity form and populating said project activity form with information for an existing project activity when an option is selected on said project control system to open said existing project activity; and
     ii. opening said project activity form when an option is selected on said project control system to open said new project activity, whereby said project activity form is blank;
   d. executing a position command, said position command positions said project control system's cursor at a current field in said project activity form, the current field being one of:
     i. the first field in said project activity form; and
     ii. the field after the previous field that was updated;
   e. executing a first display command, said first display command displays a plurality of pre-determined instructions in a user instructions window;
   f. executing a first input command, said first input command receives an input of information about said project activity;
   g. executing a first clear command, said first clear command clears said instructions in said user instructions window;
   h. executing a second display command, said second display command displays at least one instruction in said user instructions window;
   i. executing a second branch command, said second branch command directs said project control system to execute one of:
     i. a first write command, said first write command writes the information entered in said input window to said current field in said project activity form then executes a second position command that positions said project control system's cursor at a next field in said project activity form;
     ii. executing a milestone command to position said project control system's cursor at a field in said project activity form that corresponds with the milestone selected in a milestone window, where each field in said project activity form has one corresponding milestone and said project control system displays each milestone in said milestones window; and
     iii. executing an exit command, said exit command providing an option to save the changes in the project activity form prior to exiting said workflow;
   j. executing a second clear command, said second clear command clears said instructions in said user instructions window; and
   k. executing said second display command again, to repeat the commands that display said next question and receive an input in response to said next question.

20. The project control system recited in claim 19, wherein updating at least one project activity workflow comprises:
   a. opening an existing project activity workflow and executing one of:
     i. receiving an input to add a new command, the addition of said new command performs a plurality of adding tasks in said project control system including adding an entry for that command into a command parameters database;
     ii. receiving an input to edit one of an existing command and said new command, the edit of a specified command performs a plurality of edit tasks in said project control system including editing information in a parameters field for said specified command in a command parameters database; and
     iii. receiving an input to delete one of said existing command and said new command, the deletion of an unrequired command performs a plurality of deletion tasks in said project control system including deleting an entry for that command in said command parameters database and deleting an entry for that command in a next step database;
   b. interconnecting a first command and a second command, the interconnection comprising one of:
     i. performing a plurality of connection tasks in said project control system including changing an entry in said next step database, where said project control system executes said second command after said first command; and
     ii. performing a plurality of disconnection tasks in said project control system including deleting an entry in said next step database, where said project control system no longer executes said second command after said first command; and
   c. saving a change to said project activity workflow where said change is stored permanently in a project control system database.

\* \* \* \* \*